US012282282B2

(12) United States Patent
Makino et al.

(10) Patent No.: US 12,282,282 B2
(45) Date of Patent: Apr. 22, 2025

(54) IMAGE FORMING SYSTEM WITH REDUCED RISK OF DISCONNECTION OF A CABLE CONNECTING AN OPERATION UNIT AND AN IMAGE FORMING APPARATUS

(71) Applicant: CANON KABUSHIKI KAISHA, Tokyo (JP)

(72) Inventors: Yusaku Makino, Chiba (JP); Hirohisa Sawada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 18/361,534

(22) Filed: Jul. 28, 2023

(65) Prior Publication Data

US 2024/0045365 A1 Feb. 8, 2024

(30) Foreign Application Priority Data

Aug. 2, 2022 (JP) ................................ 2022-123401

(51) Int. Cl.
*G03G 15/00* (2006.01)

(52) U.S. Cl.
CPC ................................ *G03G 15/80* (2013.01)

(58) Field of Classification Search
USPC ........................................................ 399/90
See application file for complete search history.

(56) References Cited

U.S. PATENT DOCUMENTS 9,575,457 B2 2/2017 Fujita et al.
2013/0122741 A1 * 5/2013 Imoto .................... H02G 15/18
439/535

* cited by examiner

*Primary Examiner* — Quana Grainger
(74) *Attorney, Agent, or Firm* — Canon U.S.A., Inc. I.P. Division

(57) ABSTRACT

A first fixing part of a reinforcing member is fixed to a housing such that a weak-axis, where a second moment of area in a cross section of the reinforcing member in the first fixing part is minimum, intersects with a top surface, which reduces deterioration of user operability while a risk of disconnection of a cable connecting an operation unit and an image forming apparatus to each other is reduced.

6 Claims, 20 Drawing Sheets

IMAGE FORMING SYSTEM WITH REDUCED RISK OF DISCONNECTION OF A CABLE CONNECTING AN OPERATION UNIT AND AN IMAGE FORMING APPARATUS

BACKGROUND

Field of the Disclosure

The present disclosure relates to an image forming system.

Description of the Related Art

Image forming apparatuses, such as a copying machine, include an operation unit that receives, for example, an operation change and each operation setting instructed by a user. Even in systems, such as an image forming system, in which optional apparatuses including a sheet feeding unit, a conveying unit, and a post-processing unit, are connected to an image forming apparatus, a user performs setting operations for the various optional apparatuses by using the operation unit.

In a case of a large-sized image forming system having a long total length in which a plurality of optional apparatuses are connected to each other as described above, a user may desire to perform settings of the various optional apparatuses by using an operation unit at a position remote from the main body of the image forming apparatus including the operation unit. In such a case, the user needs to go back and forth between the optional apparatuses and the operation unit to operate the operation unit, which deteriorates the user operability.

U.S. Pat. No. 9,575,457 discusses an image forming apparatus in which an operation unit is able to be freely placed on a top surface of the image forming apparatus.

In a case of the operation unit that is able to be freely placed on the top surface of the image forming apparatus as described above, a cable connecting the operation unit and the image forming apparatus may be disconnected if the user drops the operation unit.

Strengthening a coating covering the cable may reduce the possibility that the cable is disconnected. However, the strengthened coating may hinder the user from moving the operation unit, deteriorating the user operability.

SUMMARY

Aspects of the present disclosure provide for reducing a risk of disconnection of a cable connecting an operation unit and an image forming apparatus, without increasing a risk of deterioration of user operability.

According to an aspect of the present disclosure, an image forming system includes an image forming unit configured to form an image on a recording medium, a housing configured to house the image forming unit and having a top surface, an operation unit configured to be movably placed on the top surface and receive a setting of an image forming condition for the recording medium, a cable configured to connect the housing and the operation unit to each other to operate the operation unit, and a reinforcing member disposed along the cable in a longitudinal direction and having a first fixing part fixed to the housing and a second fixing part fixed to the operation unit, wherein the cable has a third fixing part fixed to the housing and a fourth fixing part fixed to the operation unit, wherein a distance between the first fixing part and the second fixing part is shorter than a distance between the third fixing part and the fourth fixing part, and wherein the first fixing part is fixed to the housing such that a weak-axis, where a second moment of area of a cross section of the reinforcing member in the first fixing part is minimum, intersects with the top surface.

Further features of the present disclosure will become apparent from the following description of embodiments with reference to the attached drawings.

DESCRIPTION OF THE EMBODIMENTS

Hereinafter, an embodiment of the present disclosure will be described with reference to the drawings. Dimensions, materials, shapes, relative arrangements, and the like of components described below are not intended to limit the scope of the present disclosure only thereto unless otherwise specified. In the following description of the embodiment, as illustrated in FIG. 1, a direction toward the front of an image forming apparatus 2 is defined as a direction F, a direction toward the back of the image forming apparatus 2 is defined as a direction B, a direction toward the left of the image forming apparatus 2 is defined as a direction L, a direction toward the right of the image forming apparatus 2 is defined as a direction R, a direction upward from the image forming apparatus 2 is defined as a direction U, and a direction downward from the image forming apparatus 2 is defined as a direction D.

Figure 1:
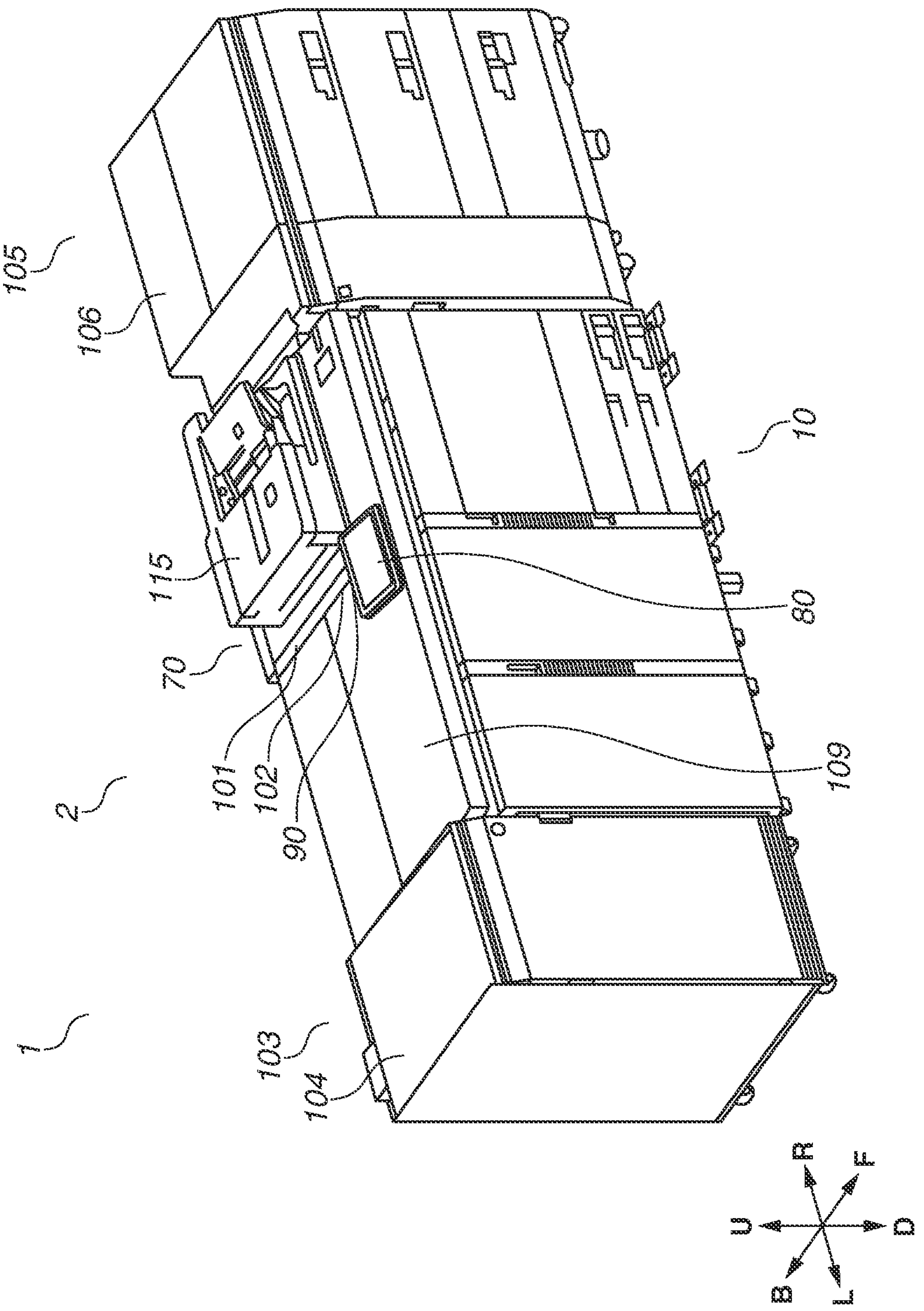
FIG. 1 is a diagram illustrating a schematic perspective view of an image forming system.

As illustrated in FIG. 1, an image forming system 1 in the present embodiment includes the image forming apparatus 2, which is a printer, for example, and a post-processing apparatus 103 disposed at a position adjacent to the left side of the image forming apparatus 2. On the post-processing apparatus 103, sheets S on which images have been formed are able to be stacked. In the present embodiment, the image forming apparatus 2 and the post-processing apparatus 103 are each defined as a housing. The housing includes a frame 181 to be described below. On a top surface of the image forming apparatus 2, an image forming apparatus top surface 109 that is usable as a work space is disposed. The image forming apparatus top surface 109 is wider than a sheet S having the maximum image-formable size by the image forming apparatus 2. A user spreads a drawing on the image forming apparatus top surface (top surface) 109 and performs drawing work, for example. Thus, the top surface 109 is configured such that, in a case where a floor 4 on which the image forming system 1 is installed is horizontal, the top surface 109 is also horizontally oriented. In addition, the top surface 109 is configured to be as flat as possible. An area, which serves as a work space 1010 illustrated in FIG. 4 described below, is an example of the work space. When the image forming system 1 is installed horizontally, the work space 1010 is also horizontal. In addition, since the area is a part of the top surface 109, the work space 1010 is a flat surface. The "flat surface" refers to a surface designed to have minimum unevenness without, for example, grooves except for a connection portion between members which is inevitably formed due to the design of the exterior of the image forming system 1.

It is sufficient for the work space 1010 to have an area in which at least a sheet of A3 size is able to be spread, and which has a flat surface. The top surface 109 is formed of, for example, a resin plate and is considered to be a "flat surface" even if there is looseness or undulation to the extent of manufacturing tolerances. The term "horizontal" as used herein does not mean "horizontal" in a mathematically strict sense, but includes "horizontal" to the extent that can be regarded as "horizontal" in practice, which means that "substantially horizontal" is also included in the term "horizontal".

In the present embodiment, a tandem-type full-color printer is described as an example of the image forming apparatus 2. Alternatively, the present disclosure is not limited to the image forming apparatus 2 of the tandem-type and can be an image forming apparatus of another type. Further, the image forming apparatus 2 is not limited to a full-color image forming apparatus and can be a monochrome or mono-color image forming apparatus.

Figure 2:
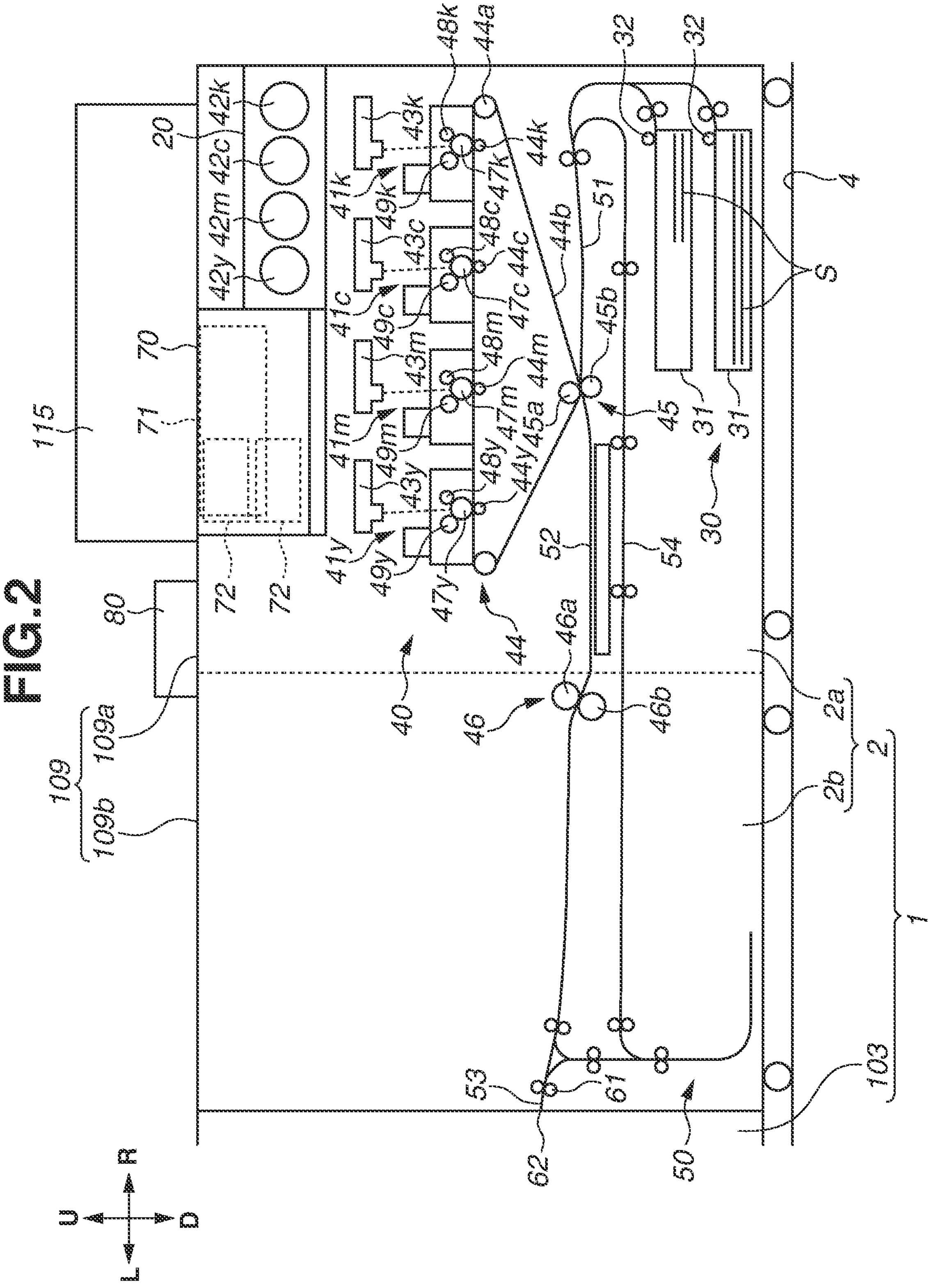
FIG. 2 is a diagram illustrating a schematic cross-sectional view of the main body of an image forming apparatus.

As illustrated in FIG. 2, the image forming apparatus 2 includes an image forming apparatus main body (hereinafter referred to as an apparatus main body) 10. In the present embodiment, the image forming apparatus 2, which is an example of a housing, is able to be divided into two parts: an image forming unit housing 2*a* and a conveying unit housing 2*b*. The conveying unit housing 2*b* conveys a sheet on which an image has been formed in the image forming unit housing 2*a* toward the post-processing apparatus 103 (not illustrated in FIG. 2). The image forming unit housing 2*a* and the conveying unit housing 2*b* are each also an example of a housing. The image forming unit housing 2*a* has a top surface 109*a*, and the conveying unit housing 2*b* has a top surface 109*b*. The image forming unit housing 2*a* and the conveying unit housing 2*b* are connectable to each other, and the top surface 109*a* and the top surface 109*b* are also connectable to each other to form one flat surface which is the top surface 109. As described above, since the image forming unit housing 2*a* and the conveying unit housing 2*b* are able to be connected to and separated from each other, when the image forming unit housing 2*a* and the conveying unit housing 2*b* are delivered to a high-rise floor of a building, for example, the image forming unit housing 2*a* and the conveying unit housing 2*b* is able to be separated and delivered independently to a predetermined floor by elevator. In this way, even in a case where the image forming system 1 is a large-sized system having a long total length, the image forming system 1 is able to be easily delivered to a predetermined floor in a building by using, for example, an elevator.

The apparatus main body 10 includes a toner supply unit 20, a sheet feeding unit 30, an image forming unit 40, a sheet conveying unit 50, an electrical unit 70, and an operation unit 80. The sheet S, which is a recording material, is a material on which a toner image is formed, and specific examples of the sheet S include plain paper, a synthetic resin sheet as a substitute for plain paper, thick paper, and a sheet for an overhead projector. That is, the sheet S corresponds to a recording medium.

The sheet feeding unit 30 disposed in a lower part of the apparatus main body 10 includes sheet cassettes 31 on which the sheets S are stacked and accommodated, and feeding rollers 32 to feed the sheets S to the image forming unit 40.

The image forming unit 40 includes an image forming unit 41 including image forming units 41*y*, 41*m*, 41*c*, and 41*k*, a toner bottle 42 including toner bottles 42*y*, 42*m*, 42*c*, and 42*k*, an exposure device 43 including exposure devices 43*y*, 43*m*, 43*c*, and 43*k*, an intermediate transfer unit 44, a secondary transfer unit 45, and a fixing device 46, to form an image.

The image forming unit 41 including four image forming units, which are the image forming units 41*y*, 41*m*, 41*c*, and 41*k*, forms toner images of four colors of yellow (y), magenta (m), cyan (c), and black (k), respectively. The image forming units 41*y*, 41*m*, 41*c*, and 41*k* are able to be separately attached to and detached from the apparatus main body 10 by the user. For example, the image forming unit 41*y* includes a photosensitive drum 47*y* for forming a toner image, a charging roller 48*y*, a developing sleeve 49*y*, and a drum cleaning blade (not illustrated). Further, the image forming unit 41*y* is supplied with toner from the toner bottle 42*y* filled with toner. As for other image forming units, which are the image forming units 41*m*, 41*c*, and 41*k*, each have the same structure as that of the image forming unit 41*y* except that the other forming units are different in toner color from each other, and thus the detailed redundant description will be omitted.

The exposure device 43y is an exposure unit that exposes the surface of the photosensitive drum 47y to form an electrostatic latent image on the surface of the photosensitive drum 47y.

The intermediate transfer unit 44 is disposed below the image forming unit 41 in the direction D. The intermediate transfer unit 44 includes a plurality of rollers including a driving roller 44a and primary transfer rollers 44y, 44m, 44c, and 44k, and an intermediate transfer belt 44b wound around the primary transfer rollers 44y, 44m, 44c, and 44k. The primary transfer rollers 44y, 44m, 44c, and 44k are disposed to face photosensitive drums 47y, 47m, 47c, and 47k, respectively, and come into contact with the intermediate transfer belt 44b. Positive transfer biases applied to the intermediate transfer belt 44b by the primary transfer rollers 44y, 44m, 44c, and 44k cause toner images having a negative polarity on the photosensitive drums 47y, 47m, 47c, and 47k to be sequentially transferred to the intermediate transfer belt 44b in a superimposed manner. Consequently, a full-color image is formed on the intermediate transfer belt 44b.

The secondary transfer unit 45 includes a secondary transfer inner roller 45a and a secondary transfer outer roller 45b. A secondary transfer bias of the positive polarity applied to the secondary transfer outer roller 45b causes the full-color image formed on the intermediate transfer belt 44b to be transferred onto the sheet S.

The secondary transfer inner roller 45a disposed inside the intermediate transfer belt 44b stretches the intermediate transfer belt 44b, and the secondary transfer outer roller 45b is disposed at a position opposite to the secondary transfer inner roller 45a across the intermediate transfer belt 44b.

The fixing device 46 includes a fixing roller 46a and a pressure roller 46b. The sheet S is nipped and conveyed between the fixing roller 46a and the pressure roller 46b forming a nip portion, whereby the toner image transferred onto the sheet S is pressed and heated to be fixed on the sheet S.

The sheet conveying unit 50 conveys the sheet S, which has been fed from the sheet feeding unit 30, from the image forming unit 40 to a sheet discharge unit. The sheet conveying unit 50 includes a pre-secondary transfer conveying path 51, a pre-fixing conveying path 52, a discharge path 53, and a re-conveying path 54.

The sheet discharge unit includes a discharge roller pair 61 disposed at a position on the downstream side of the discharge path 53, and a discharge port 62 disposed in a side part of the apparatus main body 10 in the direction L. The discharge roller pair 61 feeds the sheet S conveyed through the discharge path 53 from the nip portion and discharges the sheet S from the discharge port 62. The discharge port 62 is able to feed the sheet S to the post-processing apparatus 103 disposed in the direction L of the apparatus main body 10.

Figure 3:
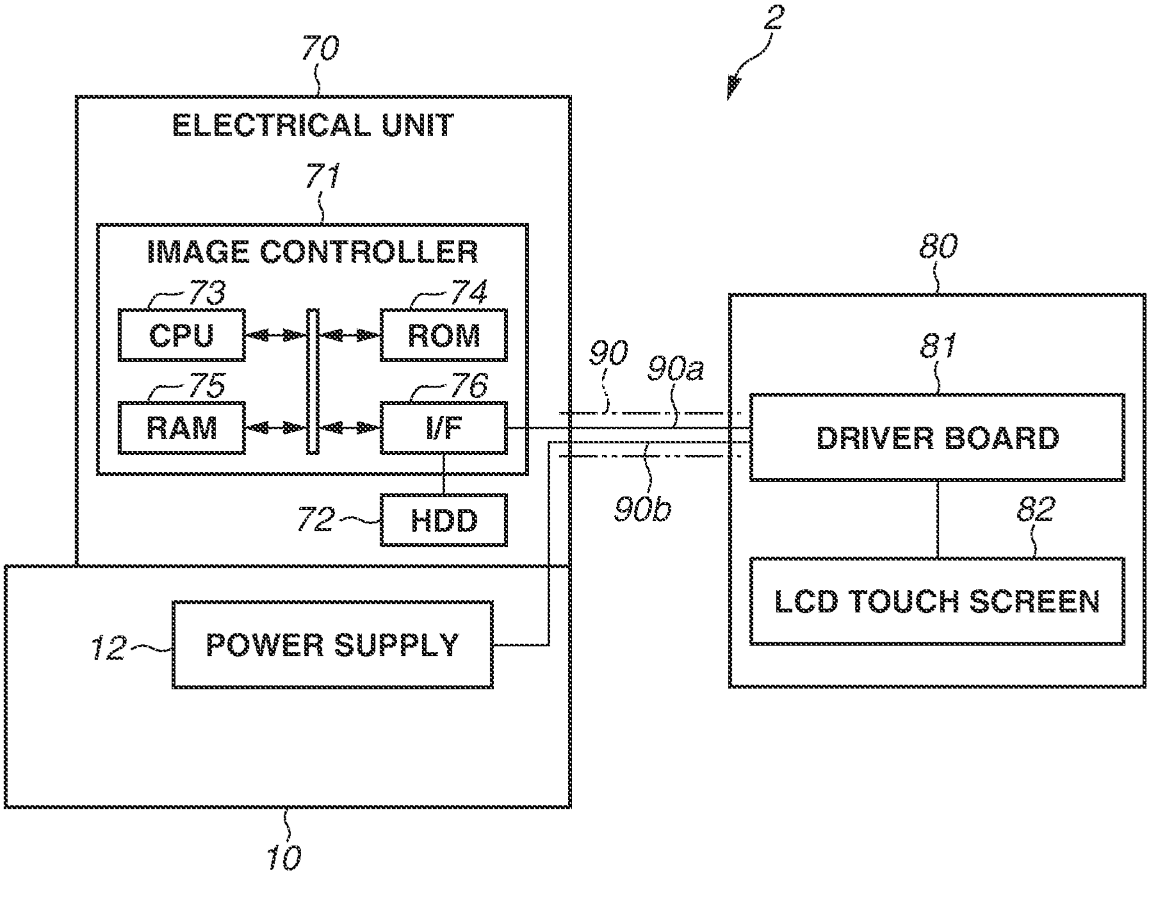
FIG. 3 is a diagram illustrating a schematic block diagram of the image forming system.

As shown in FIG. 3, the electrical unit 70 includes an image controller 71, which is a control board including a control unit, and a hard disk drive (hereinafter referred to as HDD) 72, which is a removable large-capacity storage device. The image controller 71 is configured with a computer, and includes, for example, a central processing unit (CPU) 73, a read-only memory (ROM) 74 for storing programs for controlling each unit, a random access memory (RAM) 75 for temporarily storing data, and an input/output circuit (I/F) 76 for inputting/outputting signals to/from the outside. The HDD 72 is a removable large-capacity storage device for storing electronic data, and the HDD 72 is able to mainly store an image processing program, digital image data, and incidental information about the digital image data. In image forming, image data is read out from the HDD 72.

The CPU 73 is a microprocessor that controls entire operation of the image forming apparatus 2 and is a main part of a system controller. The CPU 73 is connected to the sheet feeding unit 30, the image forming unit 40, the sheet conveying unit 50, the sheet discharge unit, the HDD 72, and the operation unit 80 via the input/output circuit 76, exchanges signals with each of the units, and controls operations of the units. The image controller 71 enables the user to perform an operation or a setting by issuing a command from a computer (not shown) connected to the apparatus main body 10 or performing an operation on the operation unit 80.

The operation unit 80 is disposed separately from the apparatus main body 10, and by using the operation unit 80, the user is able to operate each unit of the apparatus main body 10. The operation unit 80 includes a driver board 81 and a liquid crystal display (LCD) touch screen 82. The LCD touch screen 82 displays, for example, the remaining amount of sheets S and the remaining amount of toner that have been supplied to the apparatus main body 10, a warning message when the consumables run out, a procedure for supplying the consumables, and information about user operation of the image forming apparatus 2.

The LCD touch screen 82 receives settings of, for example, a size and a grammage of the sheet S, density adjustment of an image, and the number of sheets to be output, and settings of an image forming condition for a recording medium. More specifically, the LCD touch screen 82 corresponds to a display unit.

The operation unit 80 is connected to the electrical unit 70 of the apparatus main body 10 with a cable 90 and is able to be energized. The cable 90 is a bundle of a video cable 90a and a power cable 90b. Alternatively, the video cable 90a and the power cable 90b can be separate cables. The video cable 90a connects the input/output circuit 76 of the image controller 71 to the driver board 81, and the power cable 90b connects a power supply 12 of the apparatus main body 10 to the driver board 81.

An image forming operation in the image forming apparatus 2 configured as described above will be described with reference to FIG. 2.

When an image forming operation is started, the photosensitive drums 47y, 47m, 47c, and 47k are rotated and the surfaces of the photosensitive drums 47y, 47m, 47c, and 47k are charged by the charging rollers 48y, 48m, 48c, and 48k, respectively. Then, laser beams are emitted to the photosensitive drums 47y, 47m, 47c, and 47k by the exposure devices 43y, 43m, 43c, and 43k based on image information, and electrostatic latent images are formed on the surfaces of the photosensitive drums 47y, 47m, 47c, and 47k. Toner adheres to the electrostatic latent images, and the electrostatic latent images are developed and visualized as toner images, and the toner images are transferred to the intermediate transfer belt 44b.

Meanwhile, in parallel with the toner image forming operation as described above, the feeding roller 32 is rotated to feed the uppermost sheet S in the sheet cassette 31 while separating the uppermost sheet S from other sheets S. Then, the sheet S is conveyed to the secondary transfer unit 45 via the pre-secondary transfer conveying path 51 in synchronization with the full-color toner image on the intermediate transfer belt 44b. Further, the full-color toner image is transferred from the intermediate transfer belt 44b onto the sheet S, and the sheet S is conveyed to the fixing device 46, where the full-color toner image unfixed to the sheet S are heated and pressed to be fixed to the front side of the sheet S. The sheet S is discharged from the discharge port 62 by the discharge roller pair 61 and is supplied to the post-processing apparatus 103.

Operation Unit 80 in Present Exemplary Embodiment

An outline of the electrical unit 70, the operation unit 80, the cable 90, a cover 101, and an opening part 102 will be described.

The electrical unit 70 is disposed on the rear surface of the apparatus main body 10, and a connector (a connection part to be connected to the apparatus main body 10) (not illustrated) disposed at one end of the cable 90 is connected to the electrical unit 70. The cable 90 connects the apparatus main body 10 and the operation unit 80 to communicate with each other. At the other end of the cable 90, a connector (a connection part to be connected to the operation unit 80) (not illustrated) is disposed and is connected to the operation unit 80. As described above, the operation unit 80 is connected to the image forming apparatus 2 via the cable 90, but is not fixed to the top surface 109. Thus, the user is able to freely place the operation unit 80 at any position on the top surface 109 within a range of places which the cable 90 reaches. The term "freely" as used herein refers to a state in which the operation unit 80 is not fixed to the top surface 109 with, for example, a screw, which indicates, more specifically, a configuration in which the placement position of the operation unit 80 is able to be freely changed on the top surface 109.

Figure 4:
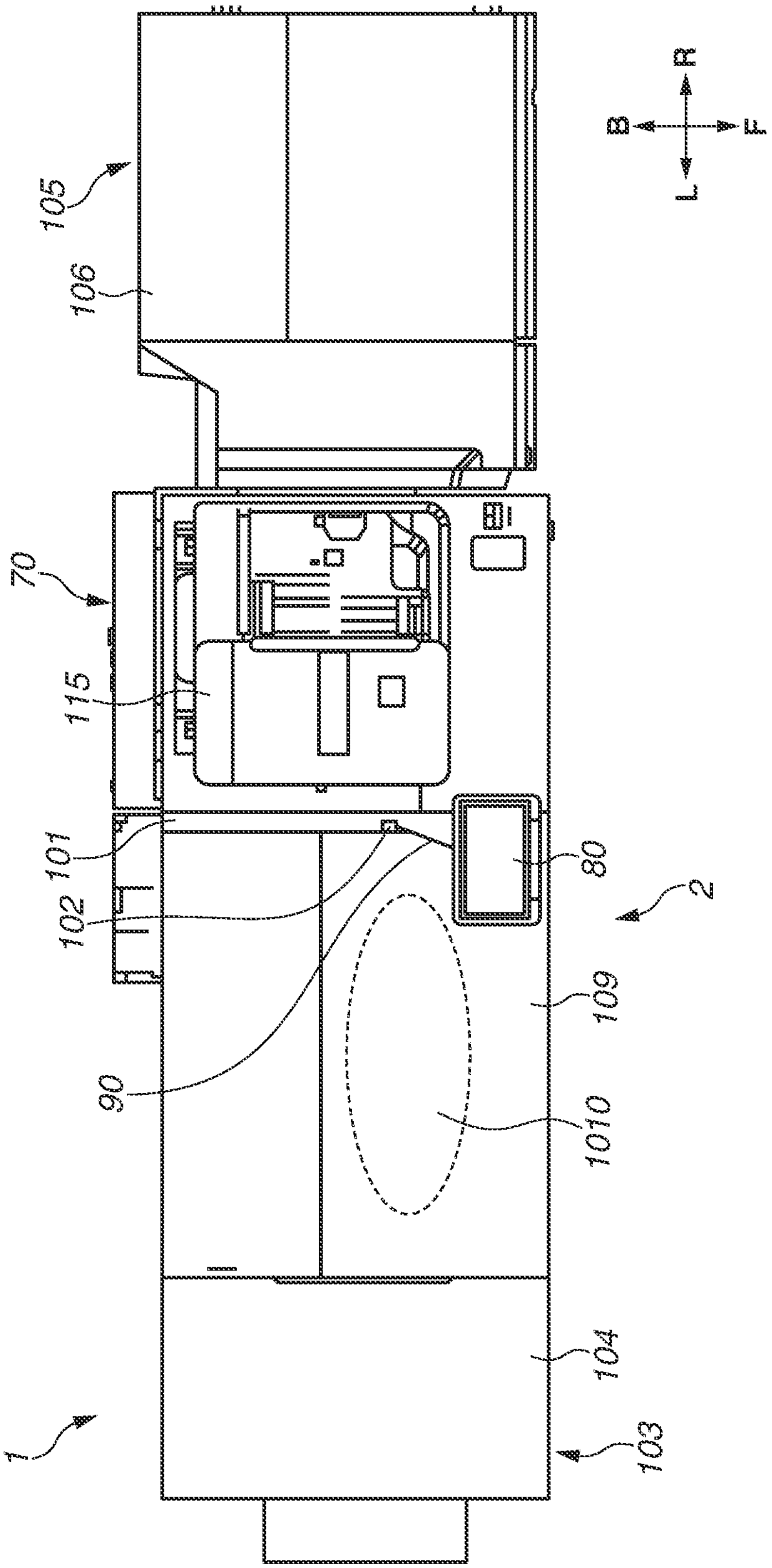
FIG. 4 is a diagram illustrating a top view of the image forming system in which an operation unit is placed on the left of a document reading apparatus on a top surface of a housing.
Figure 5:
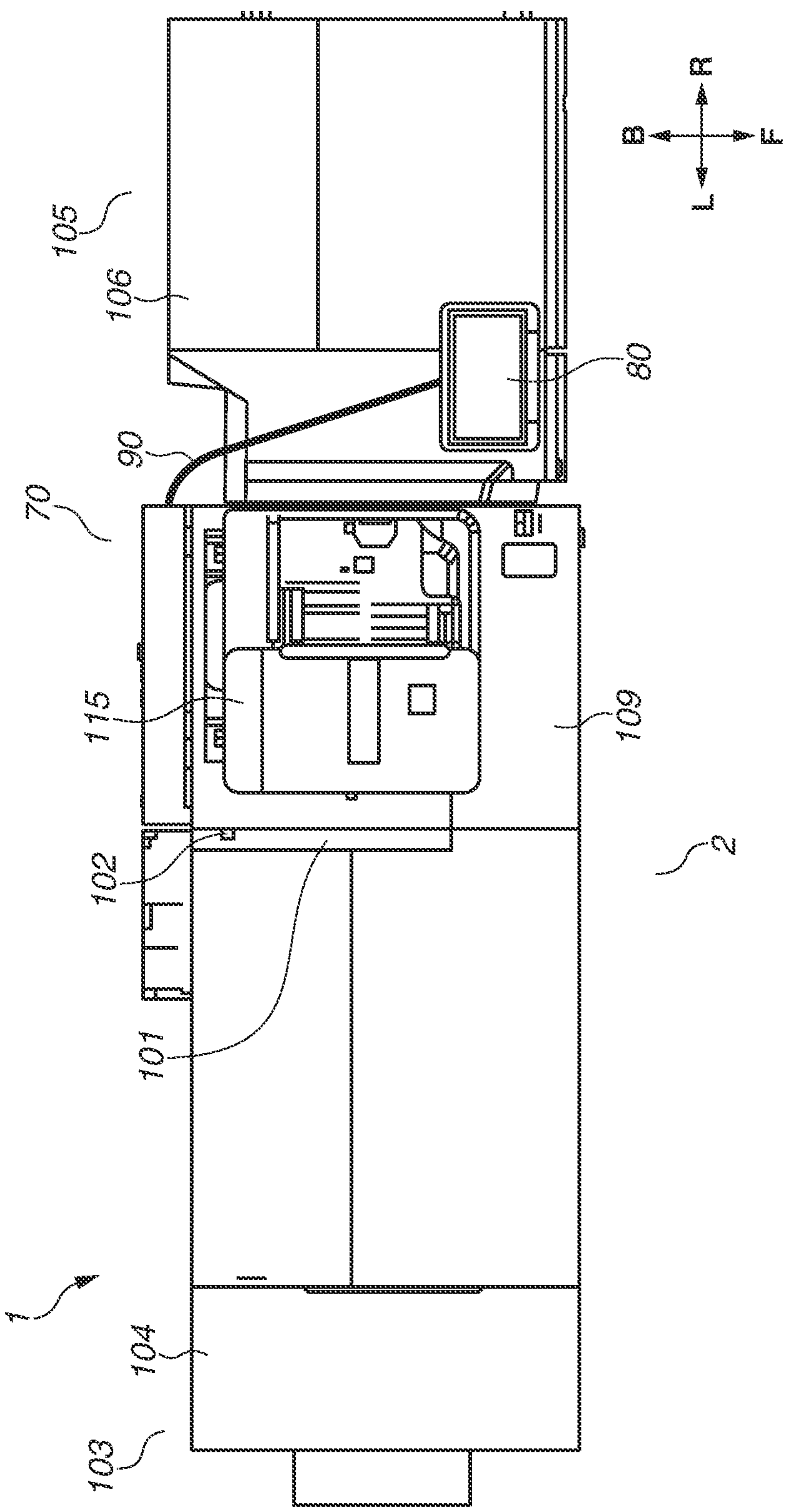
FIG. 5 is a diagram illustrating a top view of the image forming system in which the operation unit is disposed on the right of the document reading apparatus on the top surface of the housing.

For example, as shown in FIG. 4, the operation unit 80 is able to be placed in a space close to a document reading apparatus 115 on the top surface 109 of the image forming apparatus 2. As shown in FIG. 5, the operation unit 80 is also able to be placed in a space on a top surface 106 of a sheet feeding apparatus 105. Alternatively, the operation unit 80 is able to be placed on, for example, a top surface 104 of the post-processing apparatus 103 or a top surface of the image forming system 1, even though the cases are not illustrated in FIGS. 4 and 5. Alternatively, the operation unit 80 can be placed even in a space other than the top surface of the image forming system 1. More specifically, a workbench or the like can be installed in the vicinity of the image forming system 1, and the operation unit 80 can be placed on the workbench (not illustrated).

Configuration of Cable 90 in Present Exemplary Embodiment

Figure 6:
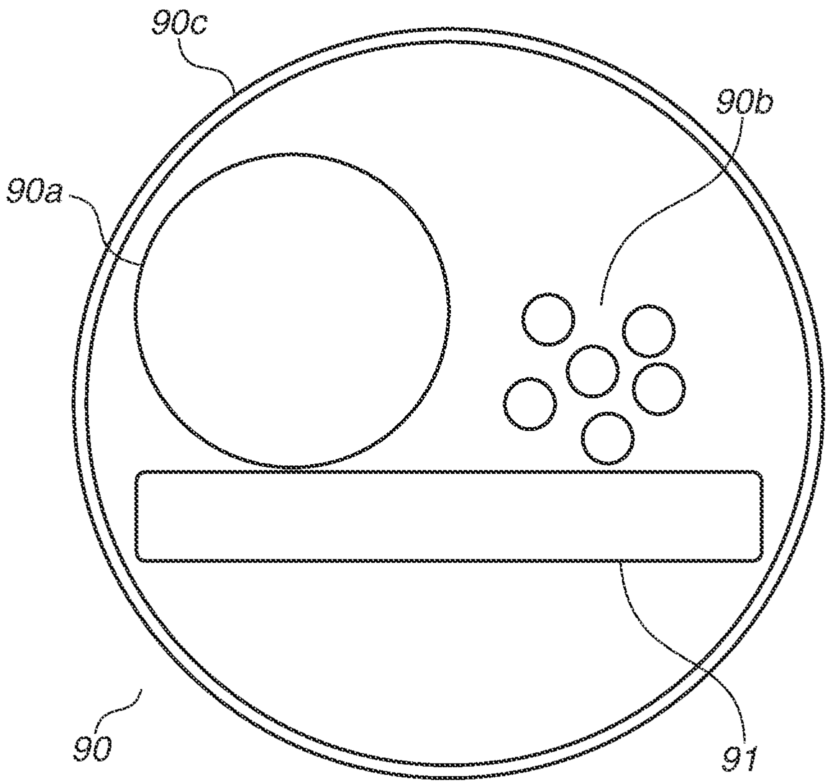
FIG. 6 is a diagram illustrating a sectional view of a cable.

The cable 90 will be described with reference to FIGS. 6, 7, and 8A and 8B. FIG. 6 is a diagram illustrating a sectional view of the cable 90. The cable 90 includes the video cable 90*a* for transmitting a video signal to be displayed on the operation unit 80 from the control board of the apparatus main body 10 to the operation unit 80, the power cable 90*b* for supplying power from the control board of the apparatus main body 10 to the operation unit 80, a reinforcing member 91 for protecting the video cable 90*a* and the power cable 90*b*, and a sheath 90*c* of a jacket material for covering and bundling the video cable 90*a*, the power cable 90*b*, and the reinforcing member 91.

As shown in FIG. 6, the cable 90 includes the video cable 90*a* (signal line), the power cable 90*b* (power line), the reinforcing member 91 (a type of rod-shaped body), and the sheath 90*c* covering the video cable 90*a*, the power cable 90*b*, and the reinforcing member 91. The video cable 90*a* and the power cable 90*b* are collectively referred to as electric wires. That is, the cable 90 includes the electric wires (video cable 90*a* and power cable 90*b*), the reinforcing member 91, and the sheath 90*c* covering the electric wires and the reinforcing member 91.

The video cable 90*a* connects the input/output circuit 76 of the image controller 71 and the driver board 81 to each other. A video signal (a kind of electric signal) is transmitted from the input/output circuit 76 to the driver board 81, and the LCD touch screen 82 displays an image based on the video signal. The electric signal transmitted through the video cable 90*a* is also a kind of signal that instructs the image forming unit 40 to form an image. The video cable 90*a* has a configuration in which a signal line for transmitting a signal is covered with a covering material made of polyvinyl chloride.

The power cable 90*b* connects the power supply 12 of the apparatus main body 10 and the driver board 81 to each other. Electric power is supplied to the operation unit 80 via the power cable 90*b*. Thus, the driver board 81 is driven, and the LCD touch screen 82 displays an image. The power cable 90*b* has a configuration in which a power line for supplying power is covered with a covering material made of polyvinyl chloride. In the present embodiment, electric power that is supplied to the operation unit 80 via the power cable 90*b* is also considered to be a kind of electric signal.

The reinforcing member 91 is a long plate-shaped member. The reinforcing member 91 is made of resin and has elasticity. The reinforcing member 91 is disposed in the longitudinal direction of the video cable 90*a* and the power cable 90*b*. As will be described in detail below, the reinforcing member 91 has a function of preventing disconnection of the video cable 90*a* and the power cable 90*b*.

The sheath 90*c* convers the video cable 90*a*, the power cable 90*b*, and the reinforcing member 91.

The sheath 90*c* in the present embodiment is a member containing polyethylene terephthalate (PET) as a main component and is a net-shaped member having shrinkability. The elasticity of the sheath 90*c* is much smaller than the elasticity of the reinforcing member 91. That is, the influence of the elastic force of the sheath 90*c* on the cable 90 is substantially zero. A main function of the sheath 90*c* is to prevent the video cable 90*a*, the power cable 90*b*, and the reinforcing member 91 from being exposed to the outside and prevent deterioration of the appearance. In addition to the main effect, since the sheath 90*c* in the present embodiment has shrinkability, the sheath 90*c* has an effect of bundling the video cable 90*a*, the power cable 90*b*, and the reinforcing member 91.

The video cable 90*a* is formed by covering the signal line for transmitting a signal with a covering material made of polyvinyl chloride (not illustrated). The power cable 90*b* is formed by bundling a plurality of cables. Each of the plurality of cables is formed by covering an electric wire for supplying electric power with a covering material made of polyvinyl chloride. The reinforcing member 91 will be described below. The video cable 90*a* and the power cable 90*b* are bundled by the sheath 90*c* made of a polyethylene terephthalate (PET) material to be configured as one cable, which is the cable 90, to protect the video cable 90*a* and the power cable 90*b* and to satisfy the aesthetic appearance for users.

The video cable 90*a* and the power cable 90*b* can be fixed to the operation unit 80 and the apparatus main body 10 by fixing components (not illustrated), such as reuse bands, at the ends of the cable 90 where the sheath 90*c* does not cover the cable 90.

Cable Fixing Method

Figure 7:
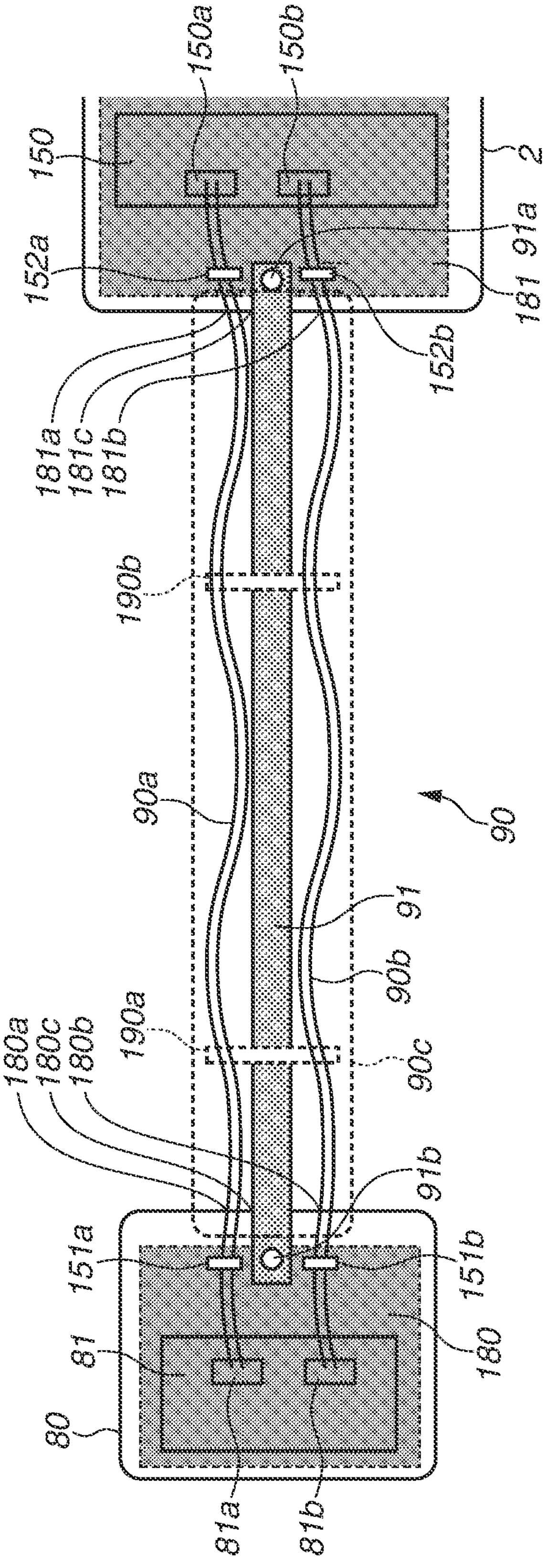
FIG. 7 is a diagram illustrating the cable and a reinforcing member.

FIG. 7 is a diagram illustrating a relationship between the lengths of the video cable 90*a*, the power cable 90*b*, and the reinforcing member 91.

As shown in FIG. 7, one end of the video cable 90*a* is connected to a connector 81*a* disposed on the driver board 81. The other end of the video cable 90*a* is connected to a connector 150*a* disposed on a main board 150. The video cable 90*a* is electrically connected to the input/output circuit 76 of the image controller 71 via the connector 150*a*.

A part of the video cable 90*a* on a side with the one end is led out from a lead-out port 180*a* disposed in a frame (inner frame) 180 of the operation unit 80. The frame 180 is, for example, an exterior cover forming an exterior of the operation unit 80. The video cable 90*a* and the power cable 90*b* are bundled together with the reinforcing member 91 inside the sheath 90*c* by a band 190*a* and a band 190*b*, and are fixed to the reinforcing member 91. With this structure, even when a force for stretching the cable 90 is applied to the cable 90 at a portion thereof between the band 190*a* and the band 190*b*, it is possible to reduce the possibility that the video cable 90*a* or the power cable 90*b* is broken at that portion.

In the part of the video cable 90*a* on the side with the one end, a part between a part connected to the connector 81*a* and a part led out from the lead-out port 180*a* is fixed to the frame 180 with, for example, a band 151*a*. The frame 180 can be, for example, a part of a frame forming the exterior cover or can be a sheet metal fixed to the exterior cover. With the configuration in which the frame 180 is formed as a separate component from the exterior cover of the operation unit 80, the load when the cable 90 is pulled is transmitted to the frame 180 via the band 151*a*. The driver board 81 is fixed to the frame 180 independently of the band 151*a* with, for example, a screw. Thus, the load when the cable 90 is pulled is not directly transmitted to the connector 81*a*, but is once transmitted through the frame 180. Because the frame 180 is made of a metal plate, the rigidity is secured, and thus the possibility that the connector 81*a* comes off from the driver board 81 and the possibility that the contact failure occurs is able to be reduced. This also applies to a relationship between the video cable 90*a* and the frame 181 and a relationship between the power cable 90*b* and the frame 180 and the frame 181.

The band 151*a* in the present embodiment is a binding band and fixes the video cable 90*a* to the frame 180 by holding around the video cable 90*a*. The band 151*a* is not limited to a binding band. The band 151*a* can be any other component as long as the band 151*a* fixes the video cable 90*a* to the frame 180. For example, a wire saddle can be used. In this way, in the present embodiment, the video cable 90*a* is fixed to the frame 180 with the band 151*a*. Thus, even when the part of the video cable 90*a* exposed from the lead-out port 180*a* is pulled, the load is not applied to the connector 81*a*, whereby the possibility that the video cable 90*a* comes off from the connector 81*a* is reduced.

Similarly, in a part of the video cable 90*a* at the other end, a part between a part connected to the connector 150*a* and a part led out from a lead-out port 181*a* is fixed to the frame 181 with, for example, a band 152*a*. The frame 181 can be a part of a frame forming an exterior cover of the housing of the image forming apparatus 2 or the sheet metal fixed to the exterior cover. The band 152*a* in the present embodiment is a binding band and fixes the video cable 90*a* to the frame 181 by holding around the video cable 90*a*. In this way, in the present embodiment, the video cable 90*a* is fixed to the frame 181 with the band 152*a*. Thus, even when a part of the video cable 90*a* exposed from the lead-out port 181*a* is pulled, the load is not applied to the connector 150*a*, whereby the possibility that the video cable 90*a* comes off from the connector 150*a* is reduced.

Next, a method of fixing the power cable 90*b* to the operation unit 80 and the image forming apparatus 2 will be described.

One end of the power cable 90*b* is connected to a connector 81*b* disposed on the driver board 81. The other end of the power cable 90*b* is connected to a connector 150*b* disposed on the main board 150. The power cable 90*b* is electrically connected to the power supply 12 via the connector 150*b*.

A part of the power cable 90*b* on a side with the one end is led out from a lead-out port 180*b* in the frame 180 of the operation unit 80. The frame 180 is, for example, the exterior cover forming the exterior of the operation unit 80.

In the part of the power cable 90*b* on the side with the one end, a part between a part connected to the connector 81*b* and a part led out from the lead-out port 180*b* is fixed to the frame 180 with, for example, a band 151*b*. The frame 180 can be, for example, a part of the frame forming the exterior cover or the sheet metal fixed to the exterior cover. The band 151*b* in the present embodiment is a binding band and fixes the power cable 90*b* to the frame 180 by holding around the power cable 90*b*. The band 151*b* is not limited to a binding band. The band 151*b* can be any other component as long as the band 151*b* fixes the power cable 90*b* to the frame 180. For example, a wire saddle can be used. In this way, in the present embodiment, the power cable 90*b* is fixed to the frame 180 with the band 151*b*. Thus, even when a part of the power cable 90*b* exposed from the lead-out port 180*b* is pulled, the load is not applied to the connector 81*b*, whereby the possibility that the power cable 90*b* comes off from the connector 81*b* is reduced.

Similarly, in a part of the power cable 90*b* on a side of the other end, a part between a part connected to the connector 150*b* and a part led out from the lead-out port 181*b* is fixed to the frame 181 with, for example, a band 152*b*. The frame 181 can be, for example, a part of the frame forming the exterior cover of the housing of the image forming apparatus 2 or the sheet metal fixed to the exterior cover. The band 152*b* in the present embodiment is a binding band and fixes the power cable 90*b* to the frame 181 by holding around the power cable 90*b*. In this way, the power cable 90*b* is fixed to the frame 181 with the band 152*b*. Thus, even when a part of the power cable 90*b* exposed from the lead-out port 181*b* is pulled, the load is not applied to the connector 150*b*, whereby the possibility that the power cable 90*b* comes off from the connector 150*b* is reduced.

Here, the part where the video cable 90*a* is fixed to the inner frame 180 with the band 151*a* is referred to as a one end side fixing part, and a part where the video cable 90*a* is fixed to the frame 181 with the band 152*a* is referred to as the other end side fixing part. The length of the video cable 90*a* from the one end side fixing part to the other end side fixing part is referred to as L1. The part where the power cable 90*b* is fixed to the inner frame 180 with the band 151*b* is referred to as an one end side fixing part (fourth fixing part), and the part where the power cable 90*b* is fixed to the frame 181 with the band 152*b* is referred to as the other end side fixing part (third fixing part). The length of the power cable 90*b* from the one end side fixing part to the other end side fixing part is defined as L2. Further, a part where the reinforcing member 91 is fixed to the frame 181 with a fixing part 91*a* is referred to as a one end side fixing part (first fixing part), and a part where the reinforcing member 91 is fixed to the inner frame 180 with a fixing part 91*b* is referred to as the other end side fixing part (second fixing part). The length of the reinforcing member 91 from the one end side fixing part to the other end side fixing part is defined as L3. In the present embodiment, the length L3 is set to be shorter than the lengths L1 and L2. In other words, even in a state where the reinforcing member 91 is stretched without being bent, bending (extra length) occurs in the video cable 90*a* in a region between the one end side fixing part and the other end side fixing part. Similarly, in a region between the one end side fixing part and the other end side fixing part of the power cable 90*b*, bending (extra length) also occurs in the power cable 90*b*. As described above and also as illustrated in FIG. 11, both the part of the video cable 90*a* from the one end side fixing part to the other end side fixing part and the part of the power cable 90*b* from the one end side fixing part to the other end side fixing part have the extra lengths. As will be described below, the reinforcing member 91 is an elastically deformable resin member, and the cable 90 is deformable. The lengths L1 to L3 have the above-described relationship to prevent the video cable 90*a* and the power cable 90*b* L3 from being disconnected even when the cable 90 is deformed.

Reinforcing Member 91

Figure 8A:
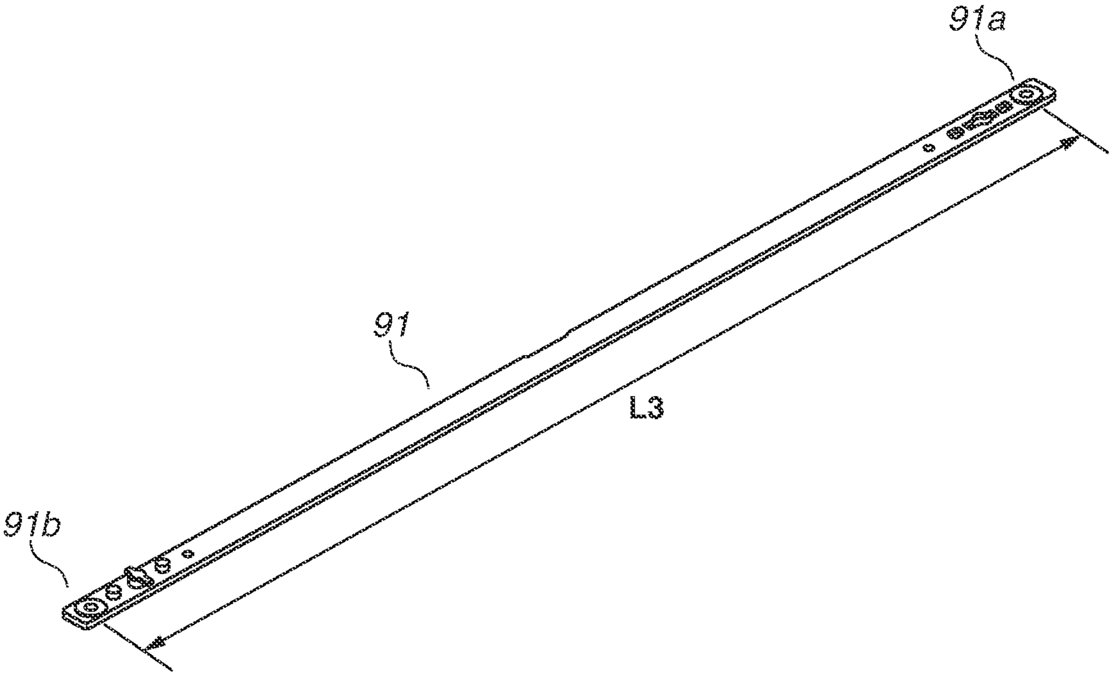
FIG. 8A is a diagram illustrating a perspective view of the reinforcing member.
Figure 8B:
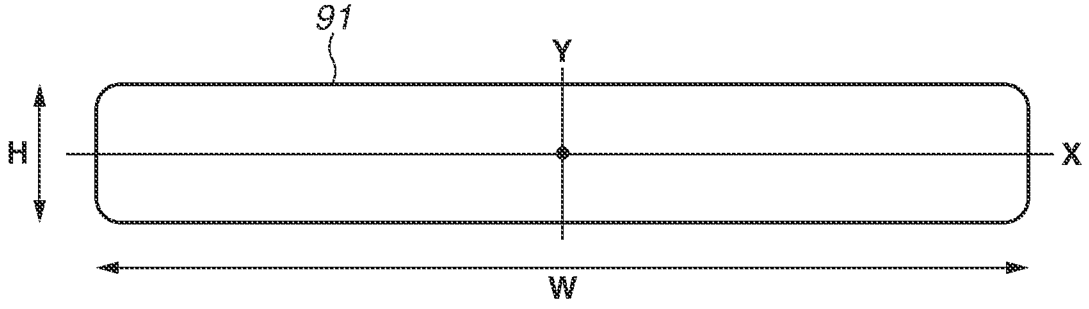
FIG. 8B is a diagram illustrating a sectional view of the reinforcing member.

FIGS. 8A and 8B are diagrams illustrating an appearance of the reinforcing member 91. The reinforcing member 91 is made of nylon and is able to be elastically deformed. The cross-section of the reinforcing member 91 is a rectangle in which a width W is larger than a thickness H as illustrated in FIG. 8B. The fixing part 91*a* having holes is disposed at one end part of the reinforcing member 91, the fixing part 91*b* having holes is disposed at the other end part, and the reinforcing member 91 is fixed to the operation unit 80 and the apparatus main body 10 (a detailed fixing method will be described below).

Figure 9A:
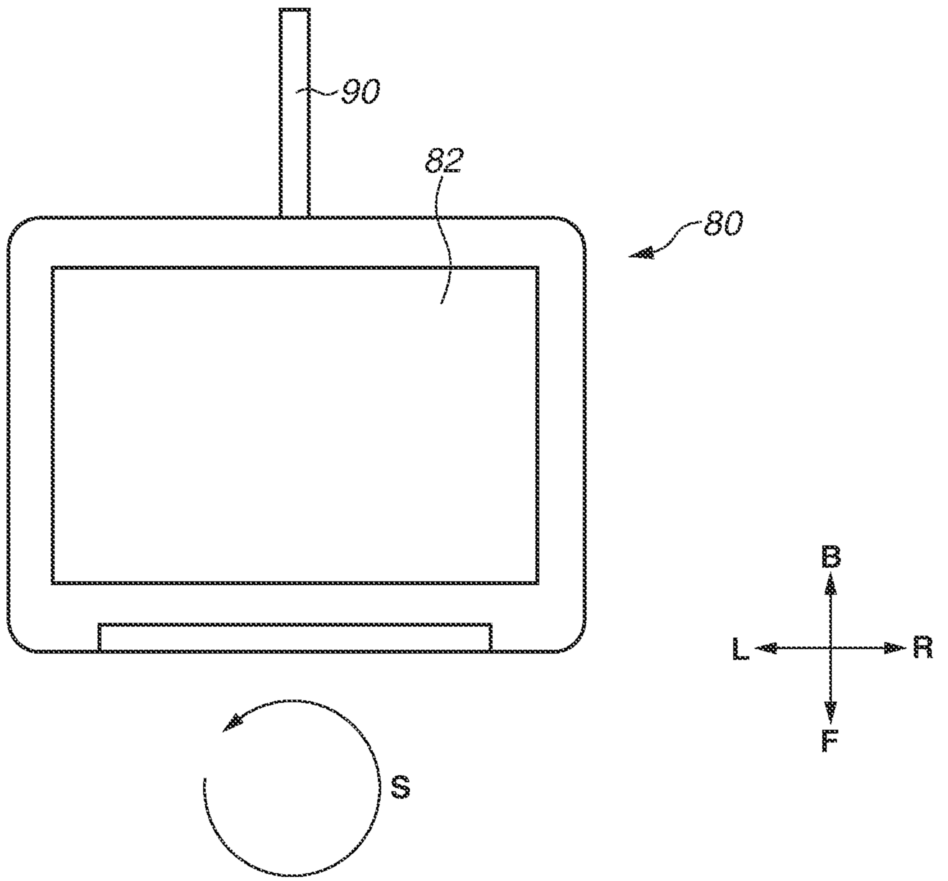
FIGS. 9A and 9B are diagrams illustrating the operation unit.

FIG. 9A is an enlarged view of the operation unit 80. The operation unit 80 is configured to be freely movable by the user. A direction in which the operation unit 80 separates from the apparatus main body 10 is the direction F, and a direction in which the operation unit 80 approaches the apparatus main body 10 is the direction B. The operation unit 80 is freely movable in directions other than the directions F and B.

Figure 9B:
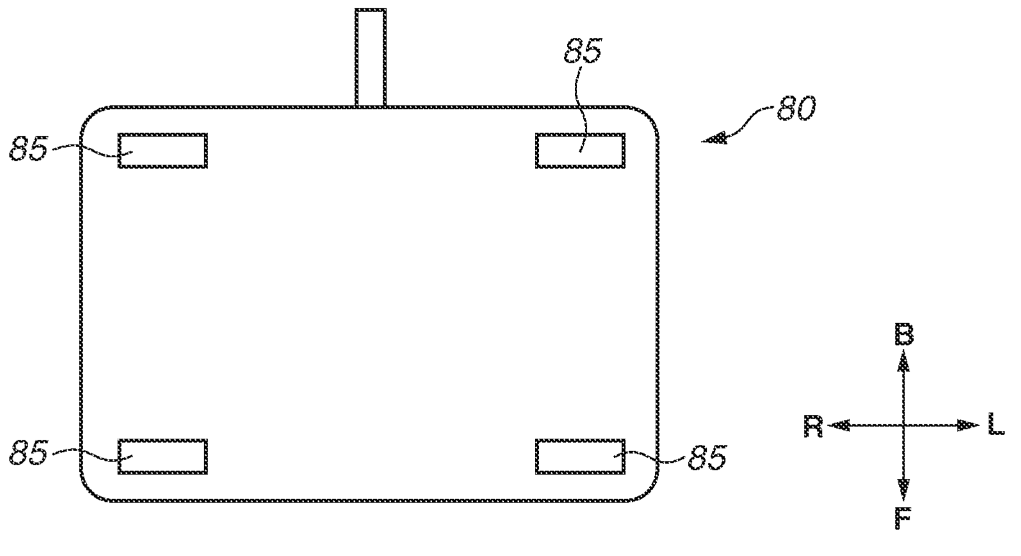

FIG. 9B is a diagram illustrating the rear surface of the operation unit 80 illustrated in FIG. 9A. Rubber feet 85 are disposed on the rear surface of the operation unit 80. The rubber feet 85 have a function for holding the operation unit 80 to prevent the operation unit 80 from sliding and moving when the operation unit 80 is placed and operated.

In a case where the operation unit 80 is moved in the direction B, the cable 90 moves in a direction in which the cable 90 bends. Thus, the reinforcing member 91 is deformed, and the reaction force is generated. If a value of the reaction force is too high, the operation unit 80 cannot be held by the frictional force of the rubber feet 85 and slips when the operation unit 80 is placed. This raises an issue that the user has difficulty in an operation to move the operation unit 80 in the direction B.

Figure 10A:
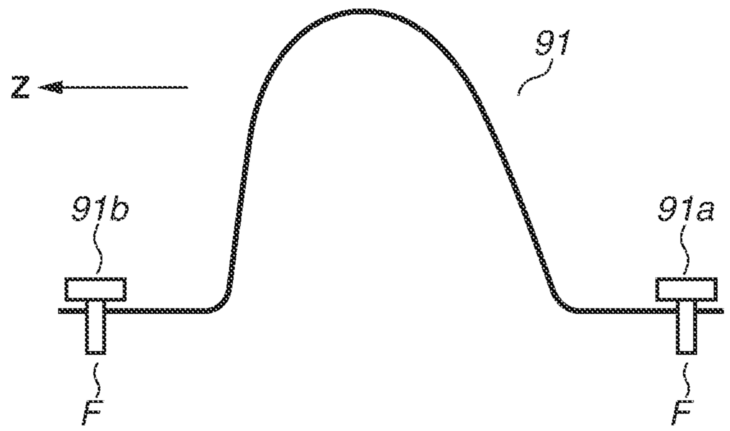
FIGS. 10A to 10C are diagrams illustrating schematic views of the reinforcing member when the reinforcing member is deformed.

FIG. 10A is a diagram illustrating a schematic side view of the reinforcing member 91 deformed when the operation unit 80 is moved in the direction B. The fixing part 91*a* on the one end part and the fixing part 91*b* on the other end part are fixed to the operation unit 80 (not illustrated in FIG. 10A) and the apparatus main body 10 (not illustrated in FIG. 10A), respectively, with screws F. A reaction force is generated in a direction Z by the deformation of the reinforcing member 91. In order to define the reaction force in this state, the reaction force is defined by a simplified measurement method illustrated in FIG. 10B.

Figure 10B:
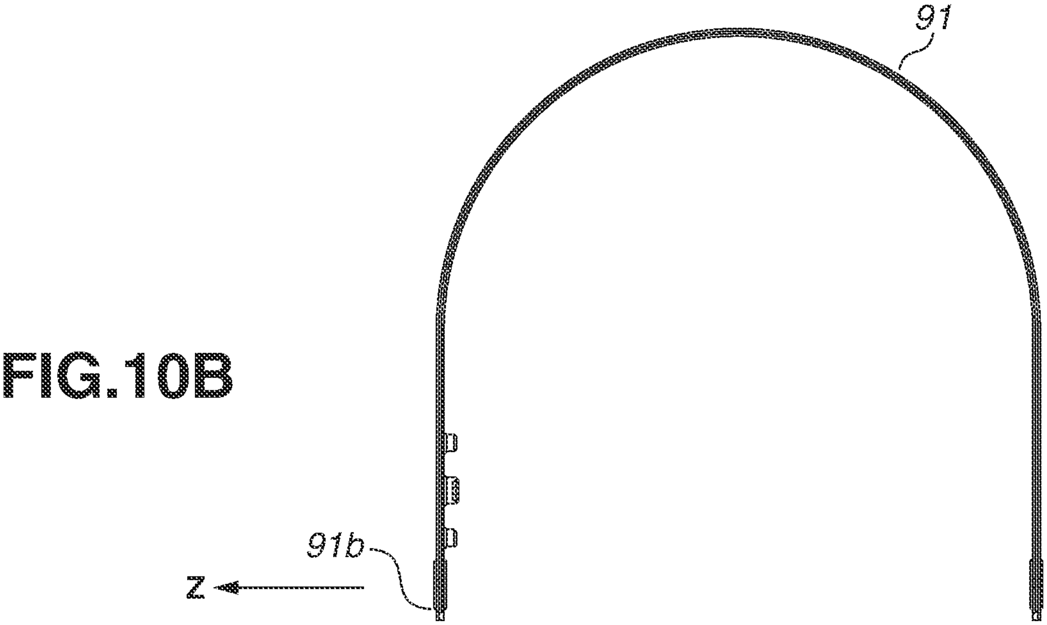

As illustrated in FIG. 10B, the fixing part 91*b* on the other end part of the reinforcing member 91 is inverted by 180 degrees (°). The reinforcing member 91 is formed such that a reaction force of about 34 gram-force (gf) is applied to the fixing part 91*b* in the direction Z.

As an example, the reinforcing member 91 is made of nylon and has a shape having a width W of 10 millimeters (mm), a thickness H of 1.5 mm, and a total length of 367.5 mm as parameters.

In a case where the reaction force that is generated when the reinforcing member 91 is deformed to the state illustrated in FIG. 10B is about 34 gf, the operation unit 80 does not slip even when the operation unit 80 is placed in the direction B, and the user's operation to move the operation unit 80 in the direction R is not hindered.

The operation unit 80 is able to be rotated by the user in a rotation direction S as illustrated in FIG. 9A. When the operation unit 80 is rotated in the rotation direction S, the cable 90 is twisted, and the video cable 90*a* and the power cable 90*b* in the cable 90 may be damaged.

Figure 10C:
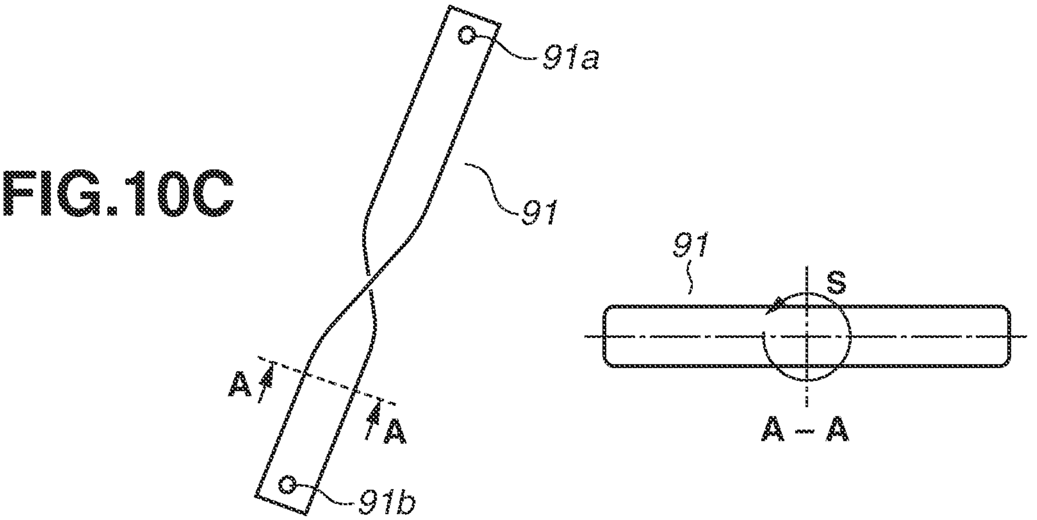

Thus, the reaction force when the reinforcing member 91 is rotated in the rotation direction S at a cross section taken along a line A-A illustrated in FIG. 10C is defined. The reinforcing member 91 is formed such that the reaction force generated when one end of the cable 90 is fixed and the other end is rotated by 180° as illustrated in FIG. 10C is about 4.6 centinewton meters (cN·m).

As an example, the reinforcing member 91 is made of nylon and has a shape having a width W of 10 mm, a thickness H of 1.5 mm, and a total length of 367.5 mm as parameters. The reinforcing member 91 desirably has a uniform cross-sectional shape in the longitudinal direction.

With a reaction force of about 4.6 cN·m that is generated with the reinforcing member 91 deformed to the above-described state, in a case where the operation unit 80 is rotated in the rotation direction S, the user realizes that the rotation operation is not normal due to the reaction force before the video cable 90*a* and the power cable 90*b* inside the cable 90 are damaged. This leads to stop of the rotation operation. The same effect can be obtained even when the user rotates the operation unit 80 in the direction opposite to the rotation direction S.

Connecting Mechanism Between Reinforcing Members 91

The length of the cable 90 connected to the operation unit 80 may vary in accordance with the size of the apparatus main body 10 and the usage of the operation unit 80 by the user.

The length of the reinforcing member 91 is also changed in accordance with the length of the cable 90. However, if a plurality of kinds of the reinforcing members 91 having different lengths are prepared for each case, the cost of molds for manufacturing the reinforcing members 91 and the cost of management of the reinforcing members 91 increase, which results in increase in the cost. Thus, as illustrated in FIG. 11, the reinforcing members 91 are connected to each other with a connecting part 92, whereby the length is able to be adjusted.

In this configuration, if the reinforcing members 91 are connected to each other with, for example, a screw, a tap part on a foot of the screw may come into contact with the video cable 90_a_ and the power cable 90_b_ inside the cable 90, and the video cable 90_a_ and the power cable 90_b_ inside the cable 90 may be damaged.

Thus, a connecting method without using additional parts including a screw will be described below.

Figure 11:
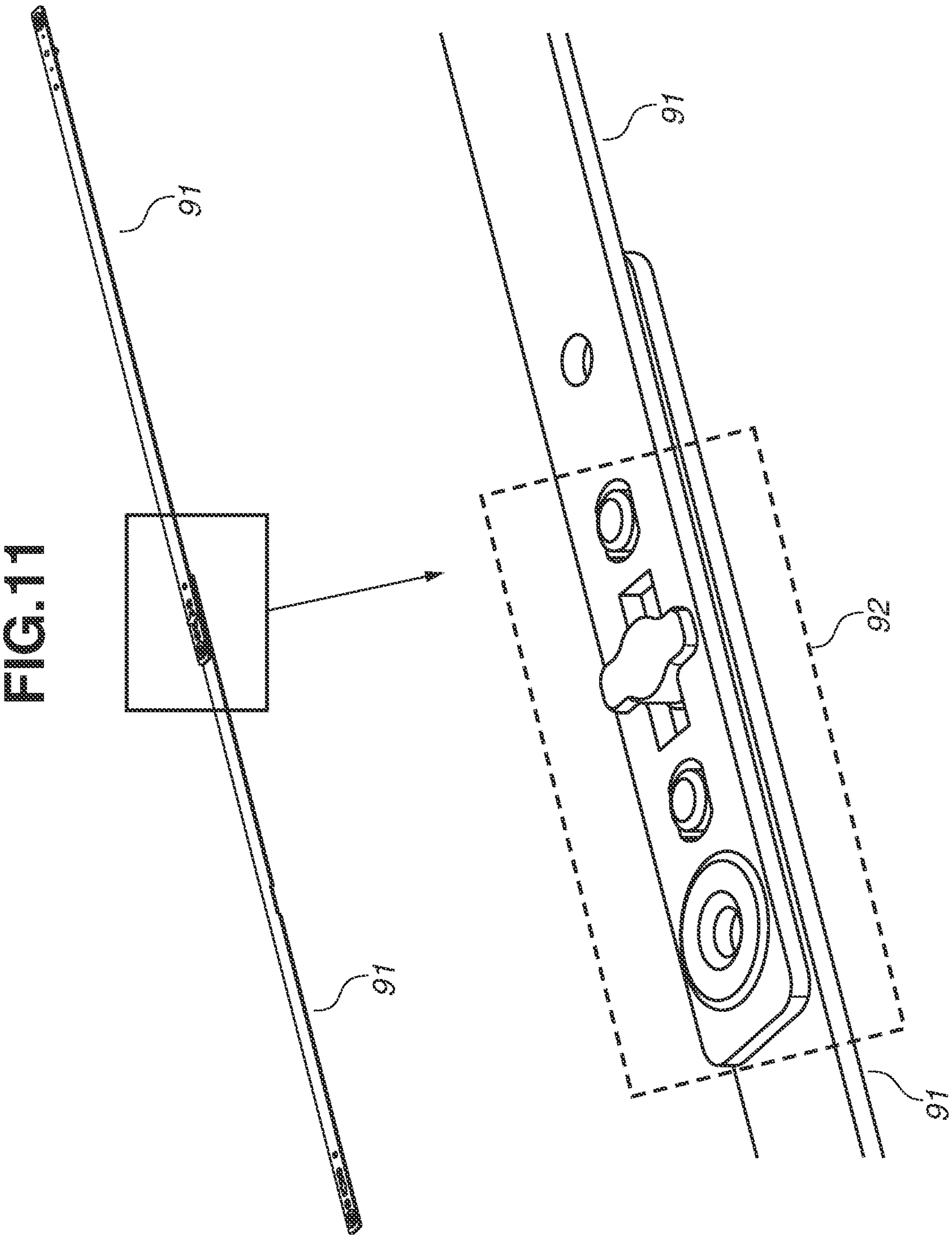
FIG. 11 is a diagram illustrating a connection structure of the reinforcing members.
Figure 12:
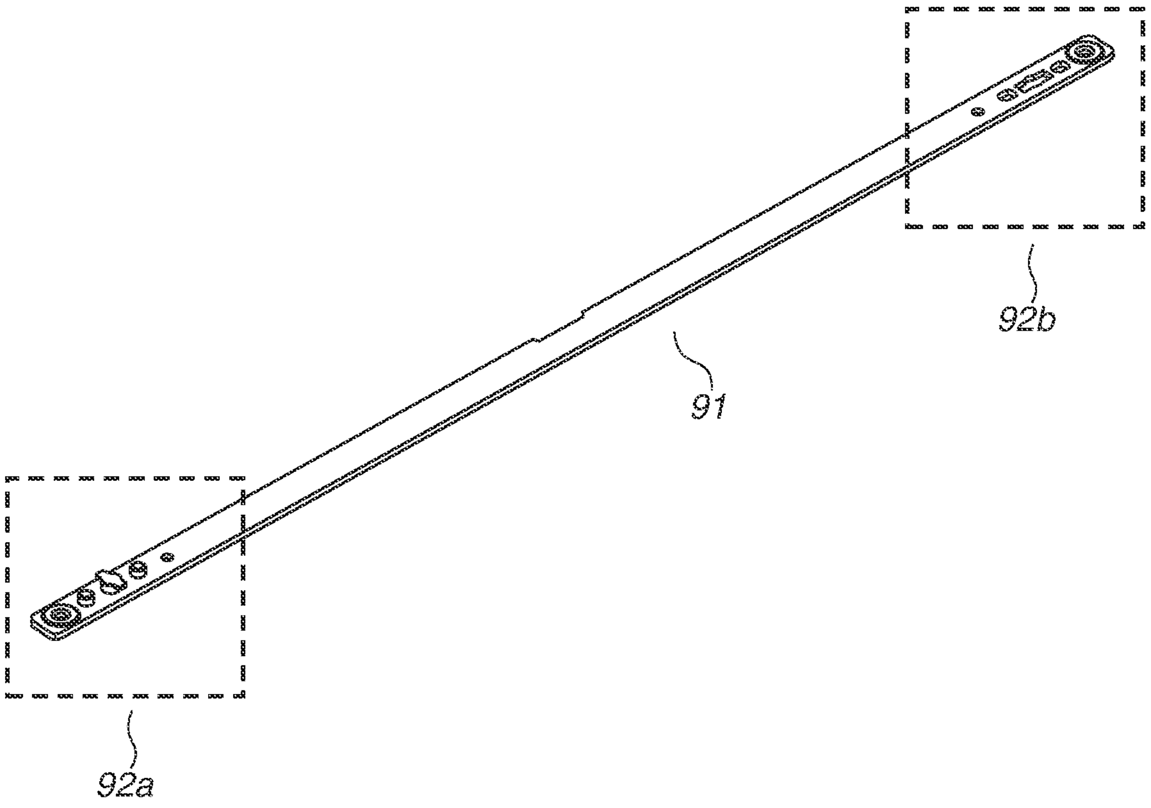
FIG. 12 is a diagram illustrating fixing parts disposed in the reinforcing member.

As shown in FIG. 11, the reinforcing member 91 has an engaging part 92_a_ including protruding shapes and an engaged part 92_b_ having holes at the one end part and the other end part, respectively, of the reinforcing member 91 to form the connecting part 92.

Figure 13A:
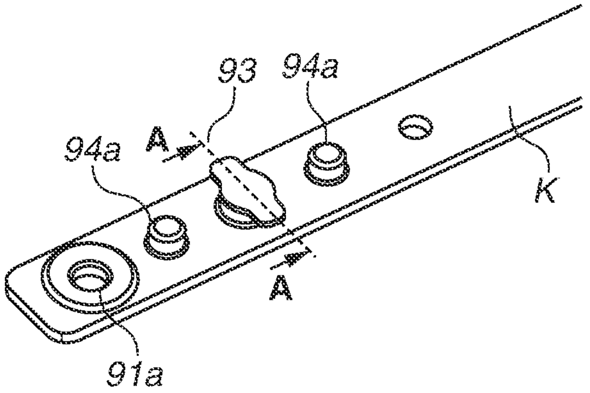
FIGS. 13A to 13D are diagrams illustrating details of the reinforcing member.
Figure 13B:
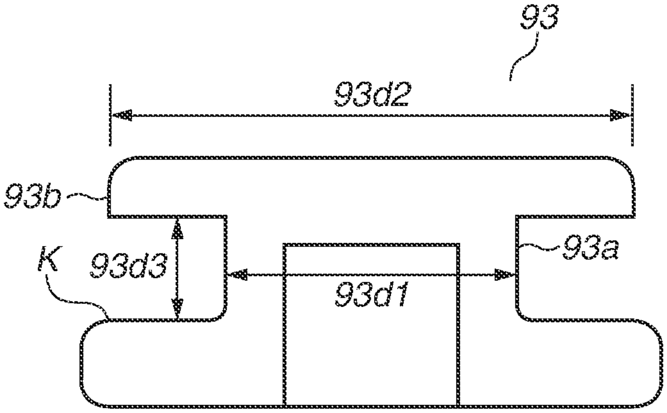

The engaging part 92_a_ will be described with reference to an enlarged view illustrated in FIG. 13A. Protruding shapes 94_a_ and a fixing shape 93 are disposed to prevent the reinforcing members 91 connected to each other from being detached from each other. FIG. 13B is a diagram illustrating a cross-sectional view of the fixing shape 93 taken along the line A-A.

A boss shape 93_a_ is formed in a direction vertical to a surface K which is the front surface of the reinforcing member 91. The boss shape 93_a_ has a boss height 93_d_3, and a hook part 93_b_ is disposed on the boss shape 93_a_. A width 93_d_2 of the hook part 93_b_ is larger than a width 93_d_1 of the boss shape 93_a_. The boss height 93_d_3 is set such that the boss height 93_d_3 is larger than the thickness H of the reinforcing member 91.

Figure 13C:
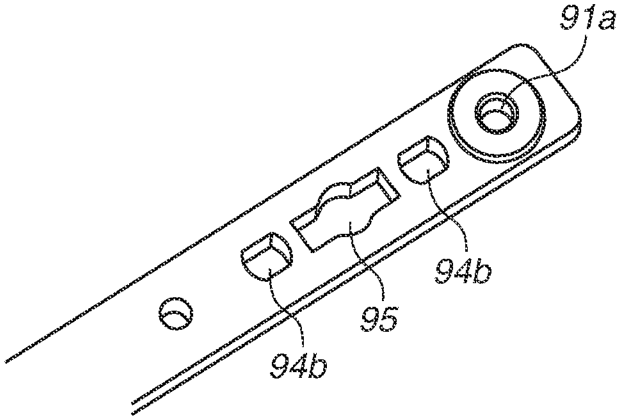

Next, the engaged part 92_b_ will be described with reference to FIG. 13C. The engaged part 92_b_ has holes 94_b_ to be engaged with the protruding shapes 94_a_ disposed on the engaging part 92_a_, and a hook hole 95 to be engaged with the fixing shape 93 disposed on the engaging part 92_a_.

Figure 13D:
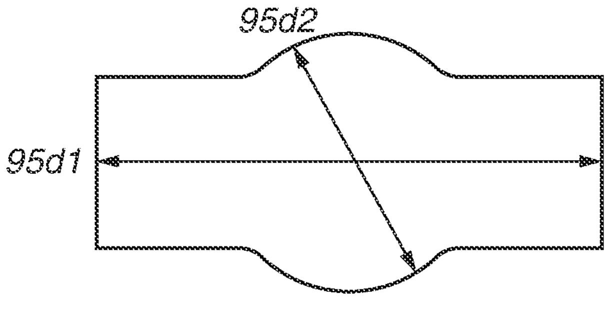

The holes 94_b_ have a shape that is to engage with the protruding shapes 94_a_. The hook hole 95 will be described with reference to the enlarged view illustrated in FIG. 13D.

To allow the hook part 93_b_ to pass through the hook hole 95, the hook hole 95 has a hook-hole-width 95_d_1 that is equal to or larger than the width 93_d_2 of the hook part 93_b_. Further, the hook hole 95 has a hole-width 95_d_2 equal to or larger than the width 93_d_1 of the boss shape 93_a_ and smaller than the width 93_d_2 of the hook part 93_b_.

Hereinafter, a method of connecting the reinforcing members 91 to each other will be described.

Figure 14:
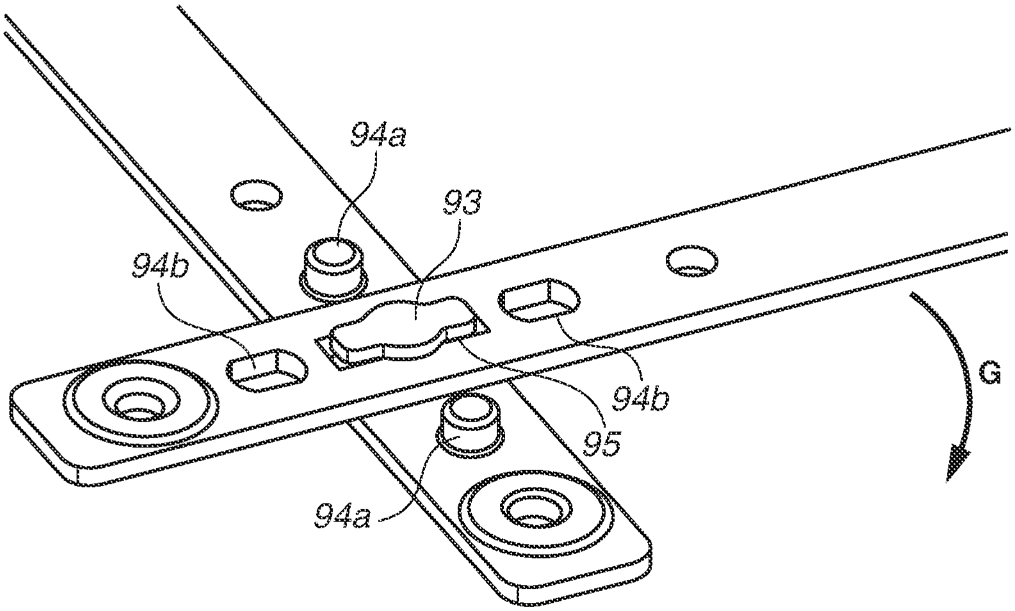
FIG. 14 is a diagram illustrating an external view of the reinforcing members in a state in which the reinforcing members are to be engaged with each other.
Figure 15:
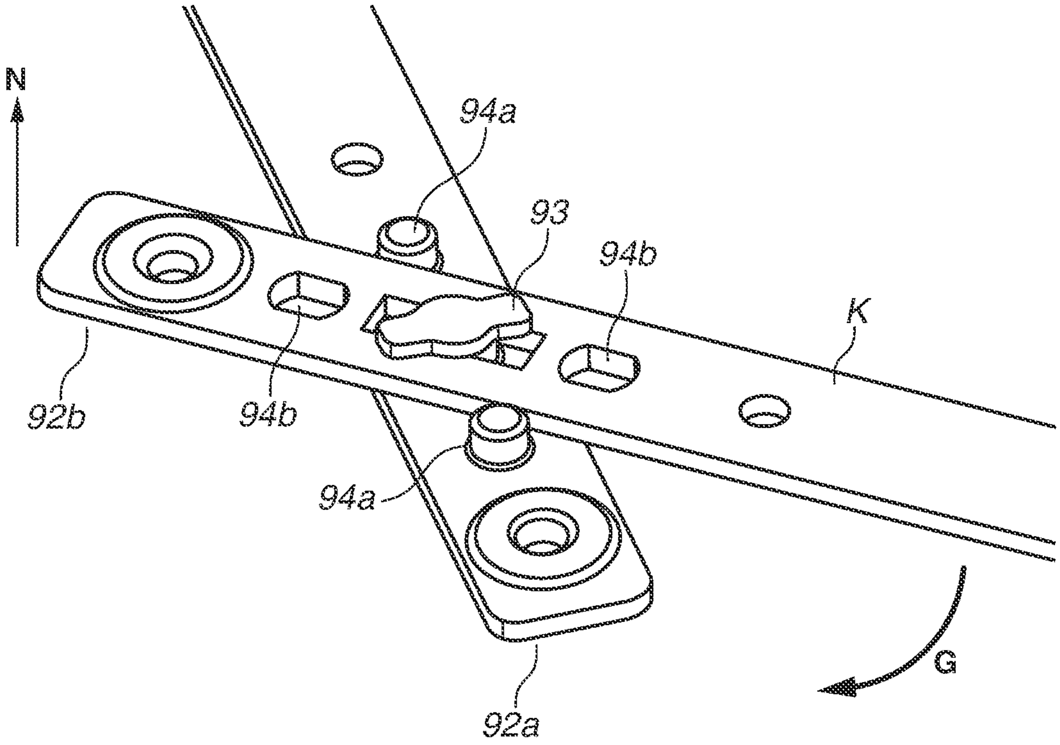
FIG. 15 is a diagram illustrating an external view of the reinforcing members in a state in which one of the reinforcing member is rotated.

FIG. 14 illustrates a state in which the engaging part 92_a_ of the reinforcing member 91 and the engaged part 92_b_ of another reinforcing member 91 overlap each other. The hook part 93_b_ has been passed through the hook hole 95, and the reinforcing member 91 is to be rotated in a direction G with the fixing shape 93 as the rotation center. FIG. 15 is a diagram illustrating a state in which the protruding shapes 94_a_ are in contact with respective counterpart members of the reinforcing member 91 when the reinforcing member 91 has been rotated. From the state illustrated in FIG. 15, the vicinities of the holes 94_b_ of the engaged part 92_b_ are elastically deformed in a direction N perpendicular to the surface K to the extent that the vicinities get over the protruding shapes 94_a_, and the reinforcing member 91 is rotated in the direction G.

Figure 16:
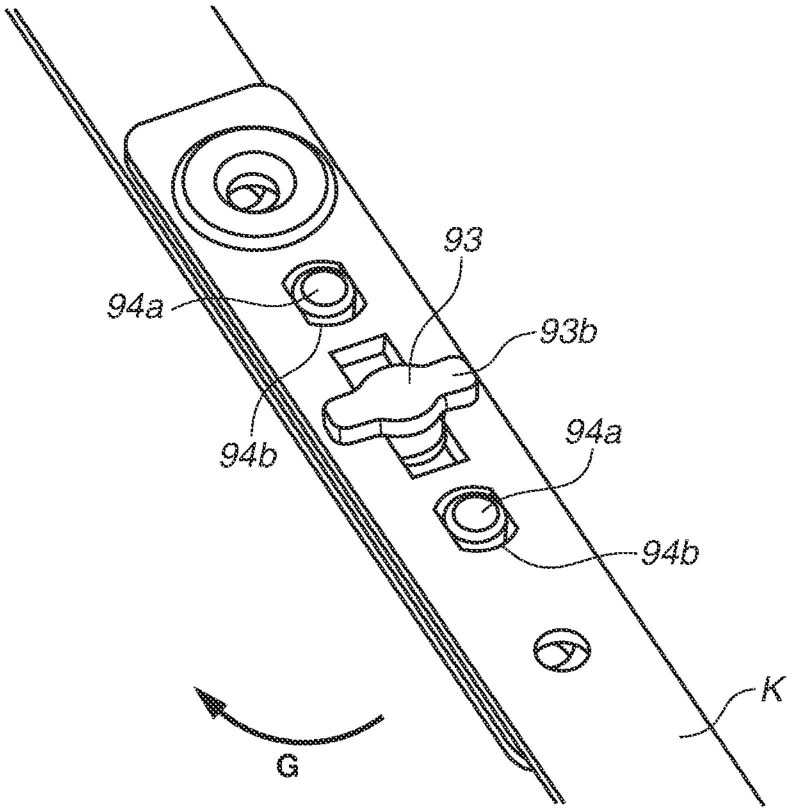
FIG. 16 is a diagram illustrating an external view of the reinforcing members in a state in which the reinforcing members have been engaged with each other.

FIG. 16 is a diagram illustrating an enlarged view of a part after the reinforcing members 91 are connected to each other by the above-described method. The protruding shapes 94_a_ are engaged with the holes 94_b_, and the reinforcing members 91 are mutually prevented from rotating in the direction G.

In the direction N perpendicular to the surface K of the reinforcing member 91, the hook part 93_b_ comes into contact with the surface K of the engaged part 92_b_, which prevents the reinforcing members 91 from coming off from each other in the direction N. Even when the reinforcing member 91 is rotated in the direction opposite to the direction G, the same effect is able to be obtained.

Figure 17A:
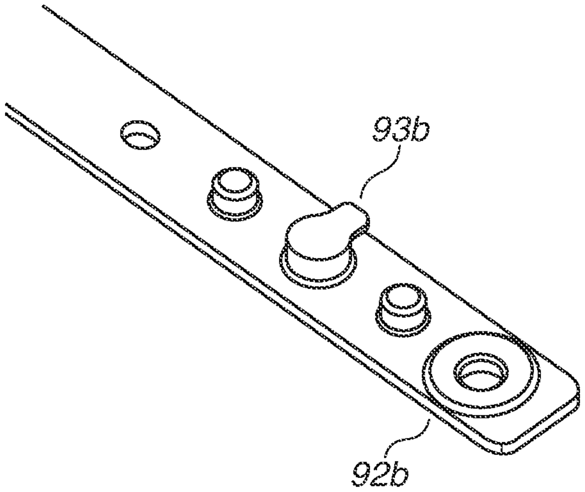
FIGS. 17A to 17C are diagrams illustrating shapes of a hook part.
Figure 17B:
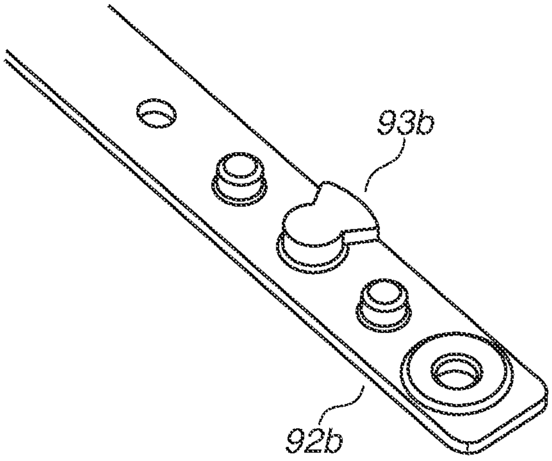
Figure 17C:
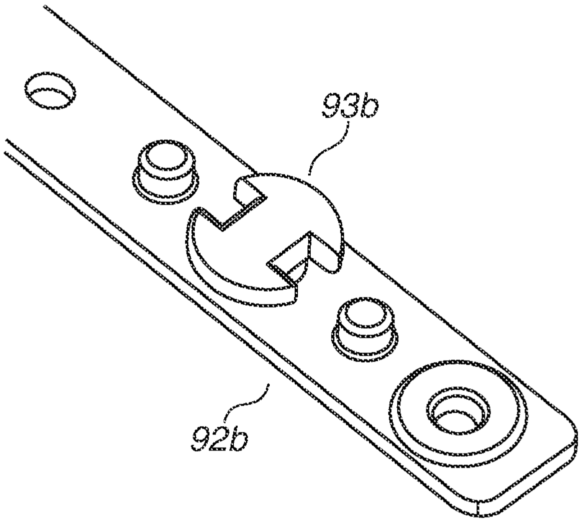

In the present embodiment, the hook part 93_b_ can have any shape as long as the hook part 93_b_ comes into contact with the surface K of the engaged part 92_b_ when the reinforcing members 91 are connected to each other. Alternatively, the hook part 93_b_ can be formed at one position as illustrated in FIG. 17A. The hook part 93_b_ can have a fan-like shape as illustrated in FIG. 17B, or have a cutout shape as illustrated in FIG. 17C.

Fixing Method of Reinforcing Member 91 to Frame 181 and Operation Unit 80

Figure 18A:
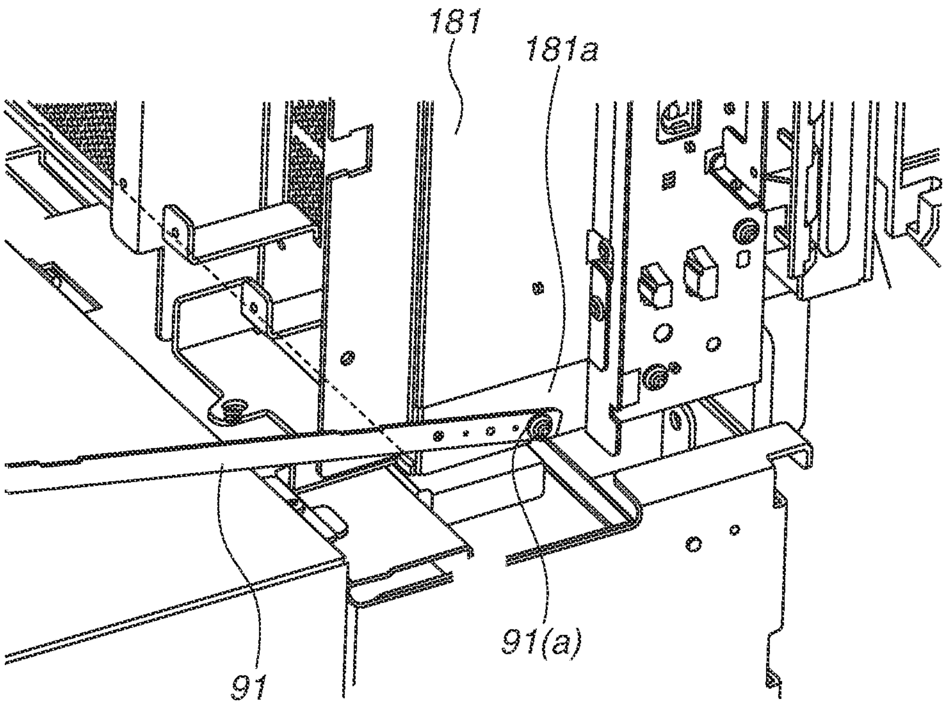
FIG. 18A is a diagram illustrating an external view of the reinforcing member and a frame fixing part.
Figure 18B:
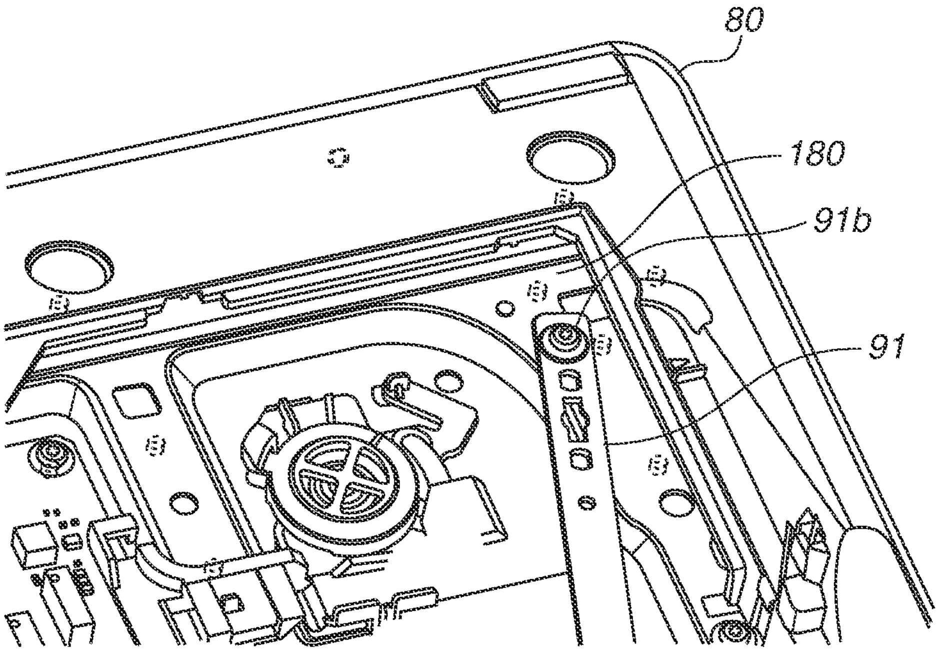
FIG. 18B is a diagram illustrating an external view of the reinforcing member and a frame of the operation unit.
Figure 19:
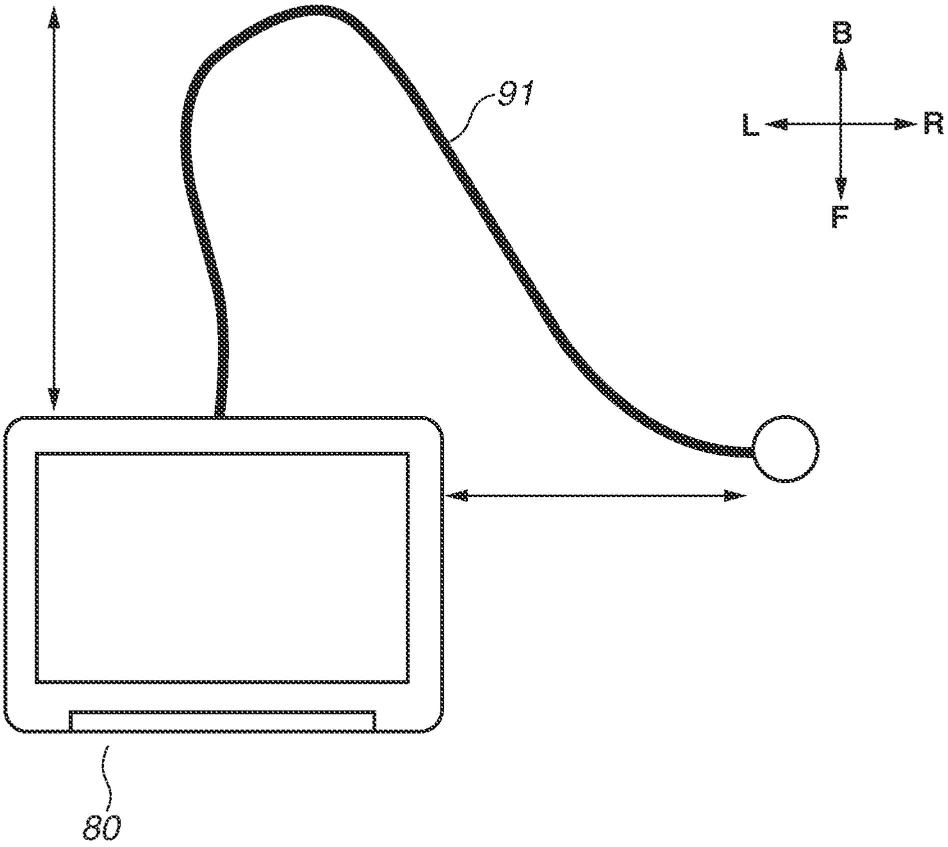
FIG. 19 is a schematic view of the reinforcing member in a state in which the reinforcing member forms in a U-shape.

A fixing method of the reinforcing member 91 to the frame 181 and the operation unit 80 will be described with reference to FIGS. 18A and 18B.

The fixing part 91_a_ disposed at the one end part of the reinforcing member 91 is fixed to a frame fixing part 181_c_ of the frame 181 with, for example, a screw. More specifically, the fixing part 91_a_ corresponds to the first fixing part.

The fixing part 91_b_ at the other end part of the reinforcing member 91 is fixed to a frame fixing part 180_c_ of the inner frame 180 of the operation unit 80 with, for example, a screw. More specifically, the fixing part 91_b_ corresponds to the second fixing part.

Since the reinforcing member 91 is made of the above-described material having the above-described shape in which the certain reaction force is generated, an operation force of the user is set such that the operation feeling when the user moves the operation unit 80 is not impaired.

FIG. 8B illustrates a cross sectional view of the reinforcing member 91. The cross section of the reinforcing member 91 in the present embodiment has a rectangular shape having the thickness H (short side) and the width W (long side). In a case where the width W is longer than the thickness H, in the cross-section of the reinforcing member 91, a second moment of area, where an X-axis is the axis, is minimized, and a second moment of area where a Y-axis is the axis, is maximized. More specifically, where the X-axis is the axis, the cross section of the reinforcing member 91 has the smallest resistance to a bending load, and when the Y-axis is the axis, the cross section of the reinforcing member 91 has the largest resistance to a bending load. Thus, the X-axis corresponds to the weak-axis and the Y-axis corresponds to the strong-axis. The X-axis and the Y-axis are collectively referred to as the cross-sectional main axis.

Since the operation unit 80 is disposed on the top surface 109 of the image forming apparatus 2, the user may mainly move the operation unit 80 in a direction horizontal to the top surface 109 of the image forming apparatus 2.

In both the fixing part 91_a_ and the fixing part 91_b_, a case where the fixing part 91_a_ and the frame fixing part 181_c_ are fixed such that a widthwise direction in the cross section of the reinforcing member 91 is horizontal to the top surface 109 of the image forming apparatus 2, and a case where the fixing part 91_b_ and the inner frame 180 are fixed will be described. In this case, when the user moves the operation unit 80 horizontally to the top surface 109 of the image forming apparatus 2, the second moment of area of the reinforcing member 91 becomes the maximum, which may hinder the user from moving the operation unit 80.

In addition, in the above described case, depending on the movement direction of the operation unit 80, there is the possibility that the reinforcing member 91 forms a U-shape due to the reaction force, which may result in such an adverse effect that the U-shape hits the arm of the user. FIG.

19 is a diagram illustrating an example of a case where the reinforcing member 91 forms in a U-shape by the reaction force.

Thus, in the present embodiment, the fixing part 91*a* and the frame fixing part 181*c* are fixed such that the widthwise direction of the reinforcing member 91 is perpendicular to the top surface 109. More specifically, by fixing the fixing part 91*a* and the frame fixing part 181*c* such that the weak-axis of the reinforcing member 91 is perpendicular to the top surface 109, the second moment of area of the reinforcing member 91 is minimized when the user moves the reinforcing member 91 in the direction horizontal to the top surface 109.

Figure 20A:
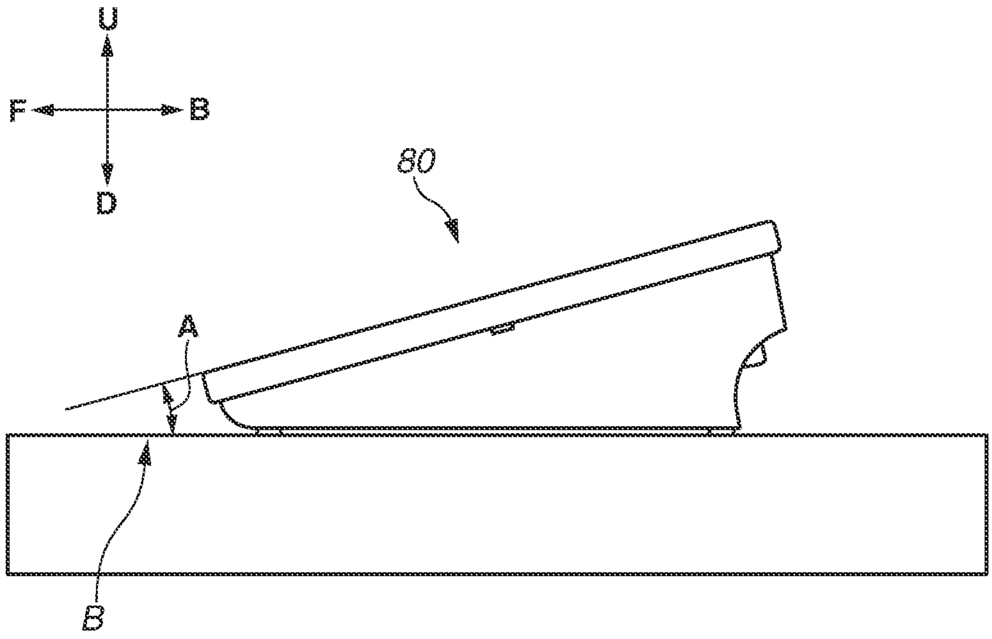
FIGS. 20A and 20B are diagrams illustrating side views of the operation unit.
Figure 20B:
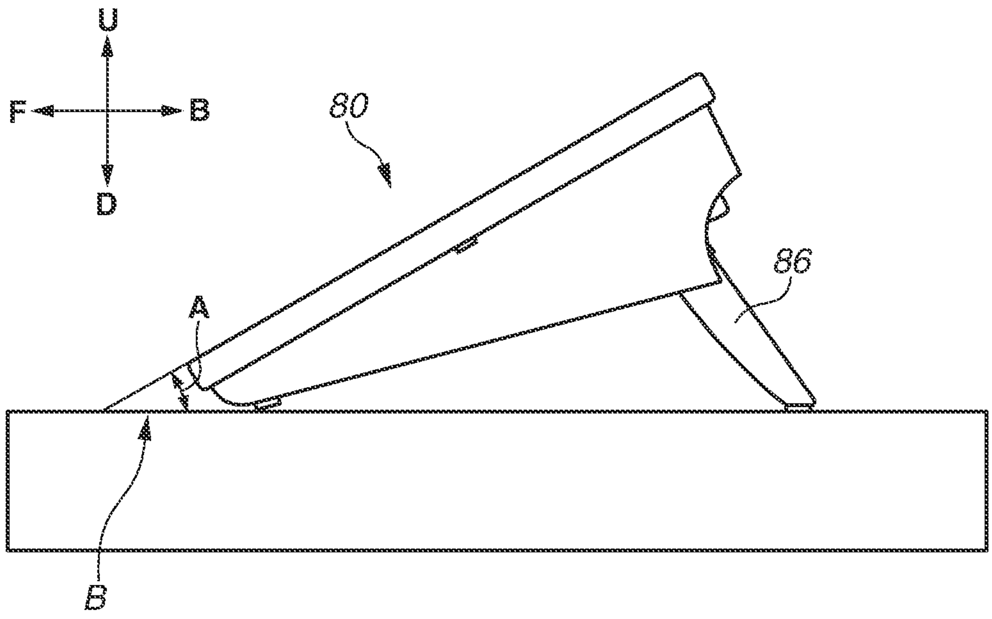

As illustrated in FIG. 20B, the operation unit 80 is able to be tilted in the direction U with an openable foot 86 pulled out from the inside of the operation unit 80 from the state illustrated in FIG. 20A, to set the operation unit 80 to the line of sight of the user who uses the operation unit 80. In this state, the reinforcing member 91 fixed to the inner frame 180 of the operation unit 80 is also displaced. Since the above-described inclination of the operation unit 80 is able to be changed by the user, it is desirable that the reaction force to be generated when the reinforcing member 91 is displaced is as small as possible. Thus, as shown in FIG. 18B, the fixing part 91*b* and the inner frame 180 are desirably fixed such that the weak-axis of the reinforcing member 91 is horizontal to the top surface 109.

While, in the present embodiment, the cross section of the reinforcing member 91 is rectangular, the shape can be different as long as the cross section has the weak-axis and the strong-axis which have second moments of area different from each other. For example, the shape can be semicircular, elliptical, or rectangular with a groove.

While, in the present embodiment, the fixing part 91*a* and the frame fixing part 181*c* are fixed such that the weak-axis of the reinforcing member 91 is horizontal to the top surface 109, the fixing angle is not limited to being perpendicular as long as the weak-axis is in a predetermined angle with respect to the top surface 109. More specifically, the fixing angle is not limited as long as the weak-axis of the reinforcing member 91 intersects with the top surface 109. It is more desirable that the fixing part 91*a* and the frame fixing part 181*c* are fixed such that the weak-axis of the reinforcing member 91 is at an angle of 90°±15° with respect to the top surface 109.

The fixing part 91*b* and the inner frame 180 can be fixed such that the weak-axis of the reinforcing members 91 is perpendicular to the top surface. In this case, the fixing angle between the fixing part 91*a* and the frame fixing part 181*c* can be set at any angle. Similarly to the fixing part 91*a*, the fixing angle of the fixing part 91*b* is not limited to being perpendicular as long as the weak-axis is at a predetermined angle with respect to the top surface 109.

By fixing the fixing part 91*a* of the reinforcing member 91 and the frame fixing part 181*c* and fixing the fixing part 91*b* of the reinforcing member 91 and the inner frame 180 according to the above-described configuration, it is possible to reduce deterioration of operability when the user moves the operation unit 80 in a direction horizontal to the top surface 109. Thus, it is possible to reduce deterioration of operability of the user while the possibility that the cable connecting the operation unit and the image forming apparatus to each other is disconnected is reduced.

According to the present disclosure, it is possible to reduce the possibility that a cable connecting an operation unit and an image forming apparatus to each other is disconnected, and to reduce the possibility that user operability is deteriorated.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-123401, filed Aug. 2, 2022, which is hereby incorporated by reference herein in its entirety.

What is claimed is:

1. An image forming system comprising:

an image forming unit configured to form an image on a recording medium;

a housing configured to house the image forming unit and having a top surface;

an operation unit configured to be movably placed on the top surface and receive a setting of an image forming condition for the recording medium;

a cable configured to connect the housing and the operation unit to each other to operate the operation unit; and a reinforcing member disposed along the cable in a longitudinal direction and having a first fixing part fixed to the housing and a second fixing part fixed to the operation unit, wherein the cable has a third fixing part fixed to the housing and a fourth fixing part fixed to the operation unit;

wherein a distance between the first fixing part and the second fixing part is shorter than a distance between the third fixing part and the fourth fixing part, and wherein the first fixing part is fixed to the housing such that a weak-axis, where a second moment of area of a cross section of the reinforcing member in the first fixing part is minimum, intersects with the top surface.

2. The image forming system according to claim 1, wherein the reinforcing member has a uniform cross-sectional shape in the longitudinal direction.

3. The image forming system according to claim 1, wherein the operation unit includes a display unit capable of displaying the received image forming condition, and wherein the second fixing part is configured such that the weak-axis of the cross section of the reinforcing member in the second fixing part intersects with the display unit.

4. The image forming system according to claim 1, wherein the operation unit includes a display unit capable of displaying the received image forming condition, and wherein the second fixing part is configured such that the weak-axis of the cross section of the reinforcing member in the second fixing part does not intersect with the display unit.

5. The image forming system according to claim 1, wherein the first fixing part is fixed to the housing such that an angle between the weak-axis of the cross section of the reinforcing member in the first fixing part and the top surface is larger than an angle between a strong-axis where the second moment of area in the cross section of the reinforcing member in the first fixing part is maximum, and the top surface.

6. The image forming system according to claim 1, wherein the first fixing part is fixed to the housing such that an angle between the weak-axis of the cross section of the reinforcing member in the first fixing part and the top surface is 90 degrees (°)±15°.

* * * * *